(12) United States Patent
Bowen et al.

(10) Patent No.: US 8,970,653 B2
(45) Date of Patent: Mar. 3, 2015

(54) VIDEO CONFERENCE CONTROL SYSTEM AND METHOD

(75) Inventors: Jonathan D. Bowen, Austin, TX (US); William Todd Clayton, Austin, TX (US); Richard P. Ford, Austin, TX (US)

(73) Assignee: VTEL Products Corporation, Inc., Austin, TX (US)

( * ) Notice: Subject to any disclaimer, the term of this patent is extended or adjusted under 35 U.S.C. 154(b) by 699 days.

(21) Appl. No.: 13/162,155

(22) Filed: Jun. 16, 2011

(65) Prior Publication Data

US 2012/0320141 A1    Dec. 20, 2012

(51) Int. Cl.
*H04N 7/14* (2006.01)

(52) U.S. Cl.
USPC .................................. 348/14.05; 348/14.03

(58) Field of Classification Search
USPC ...................... 348/14.01, 14.05, 14.03, 14.08
See application file for complete search history.

(56) References Cited

U.S. PATENT DOCUMENTS

| | | | | |
|---|---|---|---|---|
| 5,915,091 A | * | 6/1999 | Ludwig et al. ................ | 709/204 |
| 7,312,809 B2 | * | 12/2007 | Bain et al. .................. | 348/14.05 |
| 7,321,384 B1 | * | 1/2008 | Wu et al. ..................... | 348/14.08 |
| 2011/0234746 A1 | * | 9/2011 | Saleh et al. ................ | 348/14.03 |
| 2012/0019610 A1 | * | 1/2012 | Hornyak et al. ........... | 348/14.02 |
| 2012/0320147 A1 | * | 12/2012 | Kirby et al. ................ | 348/14.16 |

* cited by examiner

*Primary Examiner* — Olisa Anwah
(74) *Attorney, Agent, or Firm* — Yudell Isidore PLLC

(57) ABSTRACT

A local video conference system executing a video conference application, that lacks an ability or functionality to control a remote camera of a remote video conference system, can display video from the remote video conference system. The local video conference system can also execute a controller application that can provide the local video conference system control of the remote camera. The controller application can receive user input that selects a region of multiple regions of a display window of the video conference application indicating a camera action for the remote camera, can determine a camera action based on the user input and the selected region, and can provide the camera action to the remote video conference system via a network. The remote video conference system can pan, tilt, and/or zoom the remote camera based on the camera action received from the controller application of the local video conference system.

13 Claims, 17 Drawing Sheets

VIDEO CONFERENCE CONTROL SYSTEM AND METHOD

BACKGROUND

1. Technical Field

This disclosure relates generally to video conferencing systems, and more particularly to a method and system for a video conference user interface.

2. Description of the Related Art

Technical advances in recent years have made video conferencing increasingly wide spread alternative to physical face-to-face meetings. Once a video conference has begun, it is often desirable to adjust various components of the video conference. For example, a participant may wish to adjust and/or control a camera at a remote site (e.g., panning, tilting, zooming, etc.). However, when multiple participants are located at the same location and using the same video camera, directional controls (e.g., pan, tilt, etc.) of the camera at the location with multiple participants may not be available via the video conference software being used at another site.

BRIEF DESCRIPTION OF THE DRAWINGS

The embodiments will become apparent upon reading the following detailed description and upon reference to the accompanying drawings in which.

DETAILED DESCRIPTION

In one or more embodiments, a local video conference system executing a video conference application, that lacks an ability or functionality to control a remote camera of a remote video conference system, can display video from the remote video conference system that can include images of one or more video conference participants. The local video conference system can also execute a controller application that can provide the local video conference system control of the remote camera of the remote video conference system. The controller application can receive user input that selects a region of multiple regions of a display window of the video conference application indicating one or more camera actions for the remote camera, can determine one or more camera actions based on the user input and the selected region, and can provide the one or more camera actions to the remote video conference system via a network. The remote video conference system can pan, tilt, and/or zoom the remote camera based on the one or more camera actions received from the controller application of the local video conference system. In one or more embodiments, panning, tilting, and/or zooming the remote camera can change a field of view of the remote camera such that the local video conference system can provide images of another video conference participant and/or an object.

Figure 1:
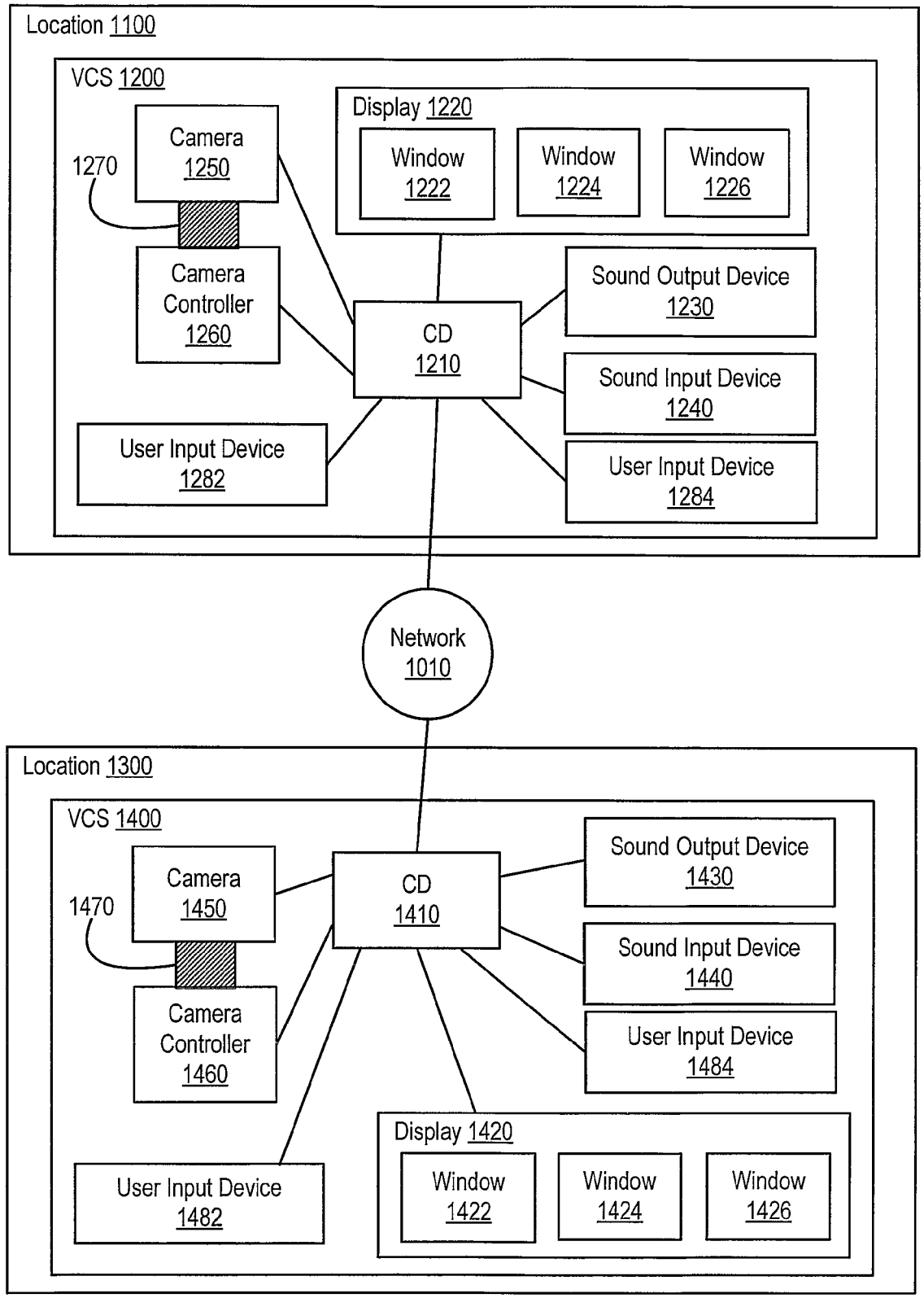
FIG. 1 is a block diagram of exemplary video conferencing systems, according to one or more embodiments.

Turning now to FIG. 1, exemplary video conferencing systems are illustrated, according to one or more embodiments. As shown, a video conferencing system (VCS) 1200 can be located at a location 1100. In one or more embodiments, location 1100 can include a geographic location. For example, the geographic location can include an office, a cubicle, a passenger compartment of a vehicle, a conference room, or an area around VCS 1200, among others. As illustrated, VCS 1200 can include a computing device (CD) 1210 and one or more of a display 1220, a sound output device 1230 (e.g., a speaker), a sound input device 1240 (e.g., a microphone), a camera 1250, a camera controller 1260, a user input device 1282, and a user input device 1284, among others, coupled to CD 1210. As shown, camera 1250 can be coupled to a camera controller 1260 via coupling device and/or mechanism 1270. For example, coupling device and/or mechanism 1270 can include a fastener and/or a physical connection means such that camera controller 1260 can physically move camera 1250. For instance, the fastener and/or the physical connection means can include a bolt, a nut, epoxy, a hook-and-loop material, and/or a double-sided tape, among others.

In one or more embodiments, display 1220 can display one or more display windows, such as one or more of windows 1222-1224. In one example, window 1222 can display graphical output from a first application executing on CD 1210. For instance, window 1222 can display video output from a video conferencing application executing on CD 1210. In a second example, window 1224 can display graphical output from a second application executing on CD 1210. For instance, window 1224 can display one or more icons of a video conference controller application executing on CD 1210. In another example, window 1226 can display graphical output from a third application executing on CD 1210. For instance, window 1226 can display a document of a word processing application executing on CD 1210.

In one or more embodiments, sound output device 1230 can receive audio data (e.g., digital audio data, analog audio data, etc.) from CD 1210 and produce sounds that are audible by one or more video conference participants at location 1100. For example, sound output device 1240 can include one or more of an amplifier and a speaker, among others. In one or more embodiments, sound input device 1240 can receive sounds from one or more video conference participants at location 1100 and provide audio data (e.g., digital audio data, analog audio data, etc.) to CD 1210. For example, sound input device 1240 can include one or more of an amplifier and a microphone, among others.

In one or more embodiments, camera 1250 can include one or more sensors that can transform received light into digital data that is usable to provide one or more of an image, a motion picture, and a video to CD 1210. For example, the digital data of one or more of an image, a motion picture, and a video can include one or more formats. For instance, the one or more formats can include one or more of a tagged image file format (TIFF), a joint photographic experts group (JPEG) format, an exchangeable image file format (EXIF), a RAW format, a portable network graphics (PNG) format, a graphic interchange format (GIF), a bitmap (BMP) format, and a vector file format, a Motion JPEG 2000 format, a FFv1 format, a DivX format, a MPEG (Moving Picture Experts Group) format, a H.264 format, and a WMV (Windows Media Video) format, among others.

In one or more embodiments, camera 1250 can provide one or more zoom functionalities. In one example, camera 1250 can provide one or more of zoom-in and zoom-out functionalities via one or more optical means (e.g., optical zoom). In another example, camera 1250 can provide one or more of zoom-in and zoom-out functionalities via one or more digital means (e.g., digital zoom). In one or more embodiments, camera 1250 can include one or more optical devices. In one example, camera 1250 can include one or more lenses that can be used to focus the received light on the sensors that can transform received light into the digital data. In another example, camera 1250 can include one or more lenses that can be used to decrease and/or increase magnification (e.g., zoom out and/or zoom in, respectively) of an object or a video conference participant. For instance, camera 1250 can include one or more one or more actuators, mechanisms, and/or mechanical means to control the one or more optical devices. In one or more embodiments, camera controller 1260 can position camera 1250 to a field of view of camera 1250. In one example, camera controller 1260 can rotate camera 1250 through an angle in a horizontal plane (e.g., panning camera 1250). In another example, camera controller 1260 can rotate camera 1250 through an angle in a vertical plane (e.g., tilting camera 1250). In one or more embodiments, one or more of camera 1250, camera controller 1260, and fastener 1270 can be included in a single device.

In one or more embodiments, one or more of user input devices 1282 and 1284 can receive user input and provide the user input to CD 1210. In one example, user input device 1282 can include a keyboard. In another example, user input device 1284 can include a pointing device (e.g., a mouse, a track-pad, a touch pad, etc.). In one or more embodiments, one or more of devices 1220-1260, 1282, and 1284 can be coupled to CD 1210 in a wired fashion. For example, CD 1210 and one or more of devices 1220-1260, 1282, and 1284 can communicate using one or more of a USB (universal serial bus), a UART (universal asynchronous receiver/transmitter), an IEEE 1394 coupling, a wired Ethernet coupling, a digital video interface (DVI) coupling, a high definition multimedia interface (HDMI), a video graphics array (VGA) coupling, a composite video coupling, a component video coupling, a SPI (serial peripheral interconnect) bus, an $I^2C$ (inter-integrated circuit) bus, a SMB (system management bus), a PCI (peripheral component interconnect), and a PCIe (PCI express), among others. In one or more embodiments, one or more of devices 1220-1260, 1282, and 1284 can be coupled to CD 1210 in a wireless fashion. For example, CD 1210 and one or more of devices 1220-1260, 1282, and 1284 can communicate using one or more of IEEE 802.11, IEEE 802.15, IEEE 802.15.4, wireless Ethernet, Bluetooth, ZigBee, 6LoWPAN, frequency modulation of a carrier wave, amplitude modulation of a carrier wave, light signals, and serial pulses, among others.

As illustrated, CD 1210 can be coupled to a network 1010. In one or more embodiments, network 1010 can be, can be coupled to, or can include one or more of a local area network (LAN), a wireless local area network (WLAN), a wide area network (WAN), a wireless WAN, a mobile telephone network (e.g., a cellular telephone network, a satellite telephone network, etc.), a public switched telephone network (PSTN), and an Internet, among others. As shown, VCS 1200 can be coupled, via network 1010, to a VCS 1400 at a location 1300. In one or more embodiments, one or more of elements 1410-1484 of VCS 1400 can include same or similar structures and/or functionalities of respective one or more elements of 1210-1284 of VCS 1200.

Figure 2A:
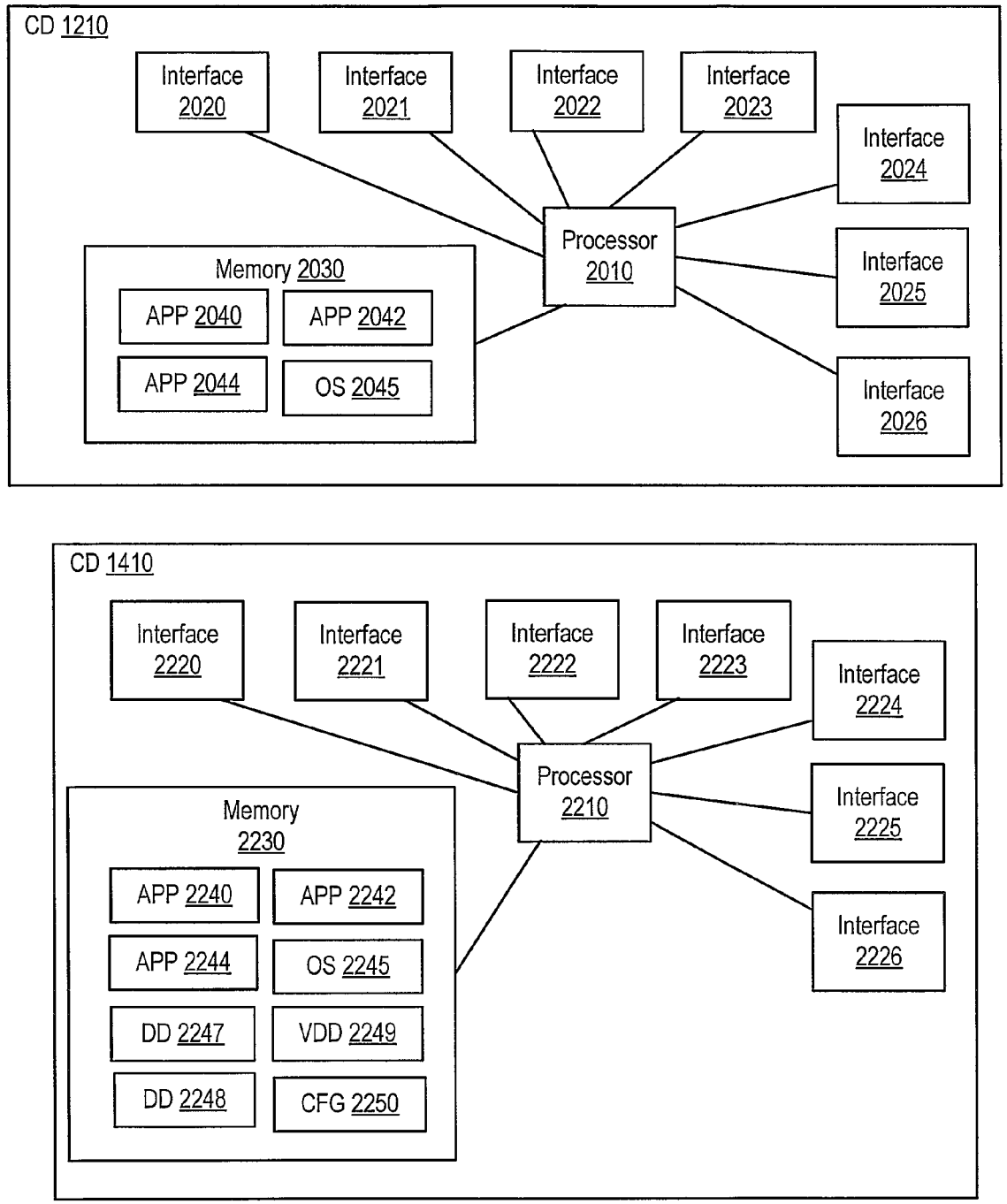
FIG. 2A is a block diagram of computing devices, according to one or more embodiments.

Turning now to FIG. 2A, computing devices are illustrated, according to one or more embodiments. As shown, CD 1210 can include a processor 2010 coupled to one or more of interfaces 2020-2026 and a memory 2030. In one or more embodiments, processor 2010 can execute instructions from memory 2030. For example, processor 2010 can implement an instruction set architecture (ISA) and can execute instructions of the ISA from memory 2030. For instance, memory 2030 can include one or more of applications (APPs) 2040-2044 and operating system (OS) 2045 that store instructions of the ISA that can be executed by processor 2010 in implementing one or more processes, methods, and/or systems described herein. In one or more embodiments, an application (APP) can be a plug-in to another APP. For example, a first APP can provide multiple executable instructions as one or more components to a second APP. For instance, APP 2044 can be a plug-in to APP 2042.

In one or more embodiments, memory 2030 can include one or more memory media and/or one or more memory devices that are machine readable and/or computer readable. In one example, the one or more memory media and/or one or more memory devices can include one or more of RAM (random access memory), DRAM (dynamic RAM), SRAM (static RAM), EDO (extended data out) RAM, and DDR SDRAM (double data rate synchronous dynamic RAM), among others. In a second example, the one or more memory media and/or one or more memory devices can include one or more of NVRAM (non-volatile RAM), PROM (programmable read only memory), EPROM (erasable PROM), EEPROM, (electrically erasable PROM), and flash memory, among others. In a third example, the one or more memory media and/or one or more memory devices can include one or more of a CD-ROM (compact disc ROM), DVD-ROM (digital video disc ROM), a floppy disc, magnetic tape, a hard disc (including one or more magnetic data storage media), and a solid state drive, among others. In another example, the one or more memory media and/or one or more memory devices can include a distributed memory system. In one instance, the distributed memory system can include a storage area network (SAN). In a second instance, the distributed memory system can include a network attached storage (NAS). In another instance, the distributed memory system can include a network file system (NFS). In one or more embodiments, memory 2030 can include one or more combinations of a first memory medium and/or a first memory device that is/are included in CD 1210 in a combination with a second memory medium and/or a second memory device that is coupled to CD 1210 and is not included in CD 1210.

As illustrated, VCS 1210 can include one or more interfaces 2020-2026 coupled to processor 2010. In one or more embodiments, one or more interfaces 2020-2026 can be utilized to interface and/or couple to one or more devices that are external to CD 1210 and/or to one or more devices that are included in CD 1210. In one example, one or more interfaces 2020-2026 can interface with one or more of a USB device, an IEEE 1394 device, a wired Ethernet device, a DVI device (e.g., a DVI display), a HDMI device (e.g., a HDMI display), a VGA device (e.g., a VGA display), a composite video device (e.g., a composite video display), a component video device (e.g., a component video display), a SPI device, an $I^2C$ device, a SMB device, a PCI device, and a PCIe device, among others. For instance, one or more interfaces 2020-2026 can implement one or more of a USB interface, an IEEE 1394 interface, a network interface, a wired Ethernet interface, a DVI interface, a HDMI interface, a VGA interface, a composite video interface, a component video interface, a SPI interface, an $I^2C$ interface, a SMB interface, a PCI interface, and a PCIe interface, among others.

In another example, one or more interfaces 2020-2026 can interface with one or more of an IEEE 802.11 device (e.g., a wireless access point, a computing device, etc.), an IEEE 802.16 device (e.g., a wireless access point), a mobile telephone network device (e.g., a base transceiver station, a satellite, etc.), an IEEE 802.15 device (e.g., a microphone, a keyboard, a speaker, a mouse, a track pad, a computing device, a printer, etc.), IEEE 802.15.4 device (e.g., a microphone, a keyboard, a speaker, a mouse, a track pad, a computing device, a printer, etc.), a wireless Ethernet device (e.g., a wireless access point, a computing device, etc.), a Bluetooth device (e.g., a microphone, a keyboard, a speaker, a mouse, a track pad, a computing device, a printer, etc.), a ZigBee device (e.g., a wireless access point, a microphone, a keyboard, a speaker, a mouse, a track pad, a computing device, a printer, etc.), and a 6LoWPAN device (e.g., a wireless access point, a computing device, a printer, etc.), among others. For instance, one or more interfaces 2020-2026 can implement one or more of an IEEE 802.11 interface, an IEEE 802.16 interface, a mobile telephone network interface, an IEEE 802.15 interface, IEEE 802.15.4 interface, a wireless Ethernet interface, a Bluetooth interface, a ZigBee interface, and a 6LoWPAN interface, among others.

In one or more embodiments, CD 1210 can be any of various types of devices, including a computer system, a portable computer, a personal digital assistant (PDA), a mobile telephone (e.g., a cellular telephone, a satellite telephone, etc.), a wearable computing device, an Internet appliance, a communications device, a handheld mobile computing device, or other wired or wireless device. In one or more embodiments, one or more elements 2210-2245 of CD 1410 can include same or similar structures and/or functionalities of respective elements 2010-2045 of CD 1210.

As illustrated, memory 2230 of CD 1410 can include one or more of a device driver (DD) 2247, a DD 2248, a virtual device driver (VDD) 2249, and a configuration utility (CFG) 2250. In one or more embodiments, DD 2247 can provide a video stream and/or an application interface to an application and a first camera, and/or DD 2248 can provide a video stream and/or an application interface to an application and a second camera. In one or more embodiments, VDD 2249 can provide a video stream and/or an application interface to an application and a device driver (e.g., DD 2247, DD 2248, etc.). In one or more embodiments, CFG 2250 can display, receive, and/or set configuration information associated with VCS 1400 (e.g., video capture source, source resolution, video protocol, etc.). For example, the configuration information associated with VCS 1400 can be displayed, received, and/or set via CFG 2250 utilizing VDD 2249.

Figure 2B:
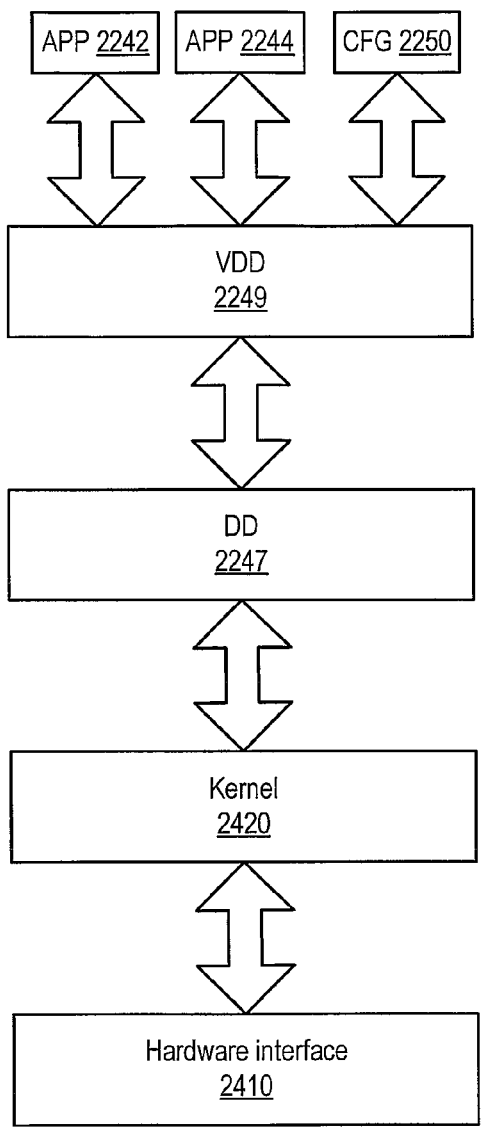
FIG. 2B is a block diagram of an exemplary layer model, according to one or more embodiments.

Turning now to FIG. 2B, an exemplary layer model is illustrated, according to one or more embodiments. As shown, a hardware interface 2410 can be coupled to a kernel 2420. In one or more embodiments, hardware interface 2410 can provide kernel 2420 access to hardware of a computing device. For example, OS 2245 can include kernel 2420, and hardware interface 2410 can provide access to hardware of CD 1410 (e.g., one or more of processor 2210, memory 2230, interfaces 2220-2226, etc.).

As illustrated, DD 2247 can be coupled to kernel 2420. In one or more embodiments, DD 2247 can be included in kernel 2420. For example, DD 2247 can be compiled into kernel 2420, or DD 2247 can be loaded into kernel 2420. In one instance, DD 2247 can directly access memory of kernel 2420. In another instance, DD 2247 can be, can include, or be included in a loadable kernel module. In one or more embodiments, DD 2247 can access kernel 2420 via a message passing process or method. For example, DD 2247 and kernel 2420 can communicate via the message passing process or method. For instance, DD 2247 can indirectly access memory of kernel 2420 via the message passing process or method.

As shown, VDD 2249 can be coupled to DD 2247. In one or more embodiments, VDD 2249 can be included in kernel 2420. For example, VDD 2249 can be compiled into kernel 2420, or VDD 2249 can be loaded into kernel 2420. In one instance, VDD 2249 can directly access memory of kernel 2420. In another instance, VDD 2249 can be, can include, or be included in a loadable kernel module. In one or more embodiments, VDD 2249 can access kernel 2420 via a message passing process or method. For example, VDD 2249 and kernel 2420 can communicate via the message passing process or method. For instance, VDD 2249 can indirectly access memory of kernel 2420 via the message passing process or method.

In one or more embodiments, DD 2247 can provide a first application interface such that APP 2242 can interface with DD 2247, and VDD 2249 can use the first application interface to interface with DD 2247 and can provide a second application interface, compatible and/or compliant with the first application interface, such that APP 2242 can interface with VDD 2249. In one example, APP 2242 can be a video conference application that interfaces (e.g., communicates) with DD 2247 via a first application interface provided by DD 2247, and VDD 2249 can utilize the first application interface to interface (e.g., communicate) with DD 2247. In another example, VDD 2249 can provide a second application interface, compatible and/or compliant with the first application interface, such that APP 2242 can interface with VDD 2249 as if APP 2242 were interfacing with and/or utilizing DD 2247. In one or more embodiments, VDD 2249 can provide a third application interface such that APP 2244 can interface with VDD 2249 to provide data indicating one or more camera actions for the remote camera, one or more camera actions based on the user input and a selected region of a window of APP 2242.

As illustrated, VDD 2249 can be coupled to one or more of APP 2242, APP 2244, and CFG 2250. In one or more embodiments, VDD 2249 can provide an interface to APP 2242 that is compatible and/or compliant with an interface that would be utilized if APP 2242 were to directly interface with DD 2247. In one example, DD 2247 can provide a video stream from camera 1450 to VDD 2249, and VDD 2249 can provide the video stream to APP 2242.

In another example, APP 2244 can provide VCS 1400 control of the remote camera of the remote video conference system via VDD 2249. For instance, APP 2244 can receive user input that selects a region of multiple regions of a display window of APP 2242 indicating one or more camera actions for the remote camera, can determine one or more camera actions based on the user input and the selected region, and can provide the one or more camera actions to VDD 2249 which can provide the one or more camera actions to the remote video conference system via a network. In one or more embodiments, one or more functionalities described with reference to APP 2244 can be included in VDD 2249. In one or more embodiments, CFG 2250 can display, receive, and/or set configuration information associated with VCS 1400 (e.g., video capture source, source resolution, video protocol, etc.). For example, the configuration information associated with VCS 1400 can be displayed, received, and/or set via CFG 2250 utilizing VDD 2249.

Figure 2C:
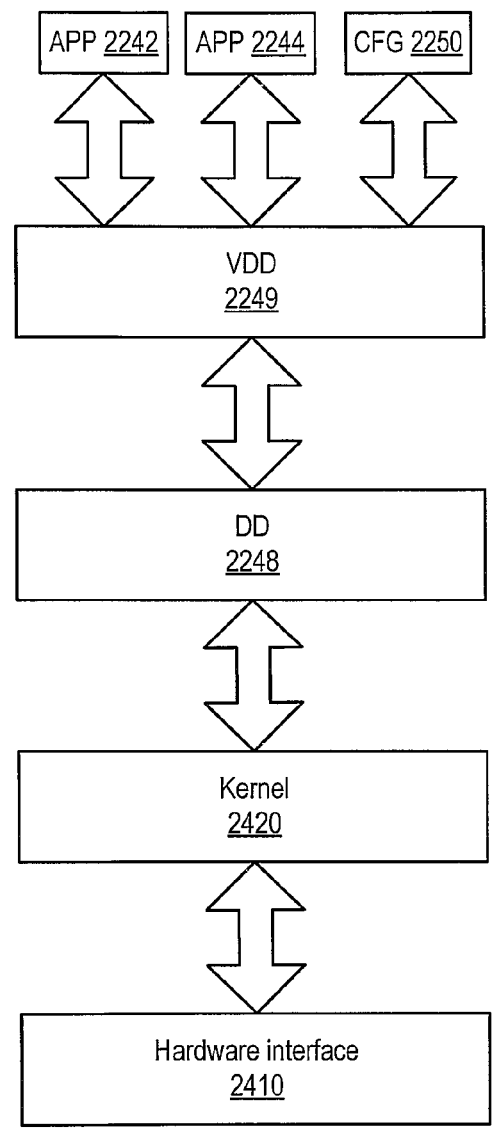
FIG. 2C is a block diagram of another exemplary layer model, according to one or more embodiments.

In one or more embodiments, VDD 2249 can interface with DD 2248, as illustrated in FIG. 2C, and can provide an interface to APP 2242 that is compatible and/or compliant with an interface that would be utilized if APP 2242 were to directly interface with DD 2247. For example, DD 2247 can interface with a composite video camera, and DD 2248 can interface with an high-definition digital camera. For instance, VDD 2249 can interface with the high-definition digital camera via DD 2248 and can provide a video stream to APP 2242 as if the video stream were from DD 2247. For example, VDD 2249 can function as and/or provide functionality of a protocol translator and/or transformer. In this fashion, VDD 2249 and/or APP 2244 can provide one or more functionalities, described with reference to VDD 2249 and/or APP 2244, to various applications, according to one or more embodiments.

Figure 3:
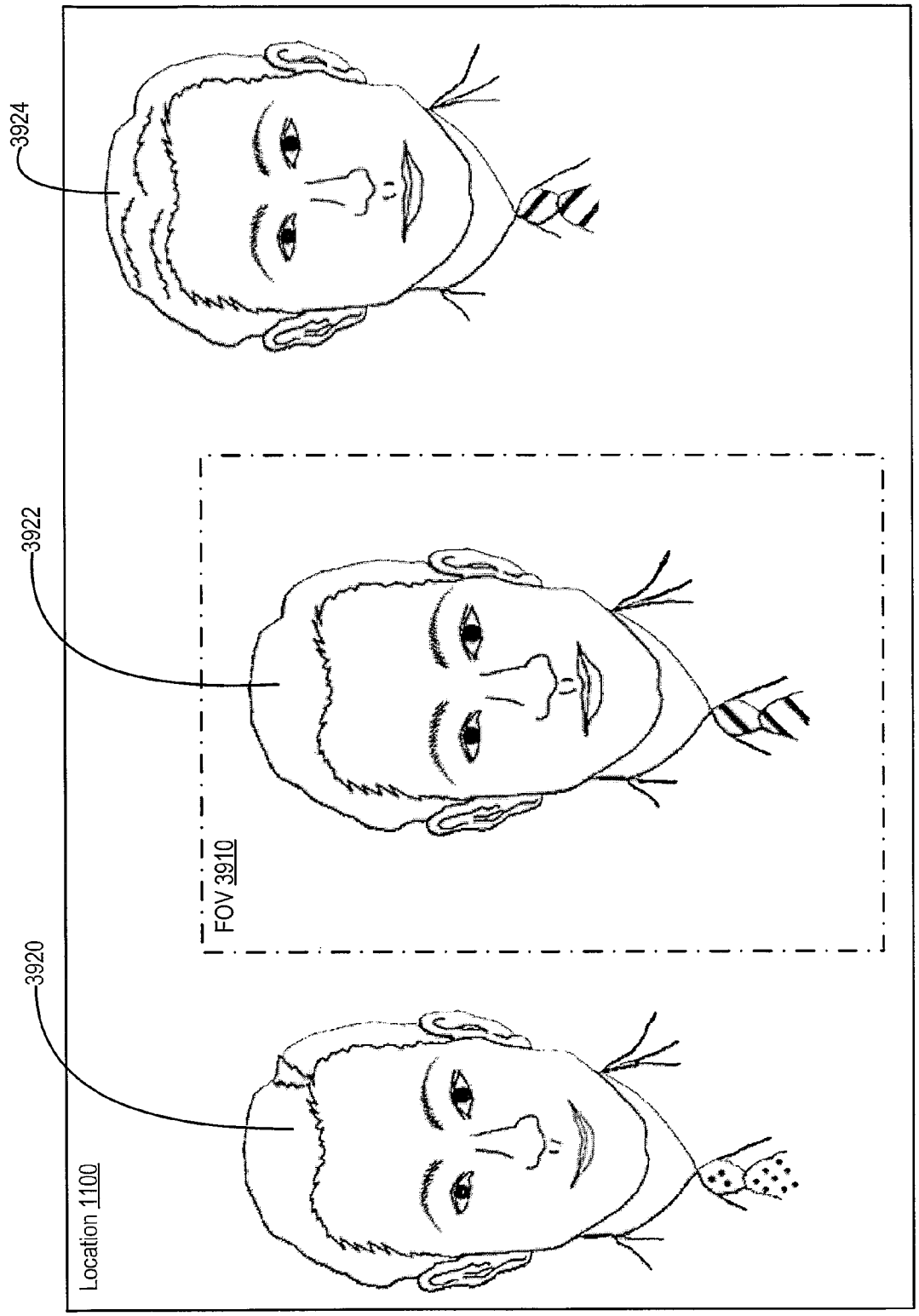
FIG. 3 illustrates participants of a video conference and a field of view of a camera at a remote location, according to one or more embodiments.

Turning now to FIG. 3, participants of a video conference and a field of view of a camera at a remote location are illustrated, according to one or more embodiments. As shown, a field of view (FOV) 3910 of camera 1250, positioned with camera controller 1260, at location 1100 can capture images of a video conference participant 3922. As illustrated, camera 1250 may not capture images of video conference participants 3020 and 3024 unless camera controller 1260 controller positions camera 1250 such that FOV 3910 of camera 1250 can capture images of participant 3920 or participant 3924.

In one example, a video conferencing application, such as APP 2242, of VCS 1400 at location 1300 may be designed and/or configured for one-to-one video conferencing. For instance, APP 2242 may not include one or more functionalities to change a position of camera 1250 at a remote location (e.g., location 1100) so that FOV 3910 of camera 1250 can capture images of participant 3920 or participant 3924. In one or more embodiments, APP 2244 can include and/or implement one or more functionalities to change a position of camera 1250 at the remote location such that FOV 3910 of camera 1250 can capture images of participant 3920 or participant 3924. In one example, APP 2244 can receive user input to pan to the left and send one or more commands to VCS 1200 to have camera 1250 panned to the left so that FOV 3910 of camera 1250 can capture images of participant 3920.

In another example, APP 2244 can receive user input to pan to the right and tilt upwards and send one or more commands to VCS 1200 to have camera 1250 panned to the right and tilted upwards so that FOV 3910 of camera 1250 can capture images of participant 3924.

Figure 4A:
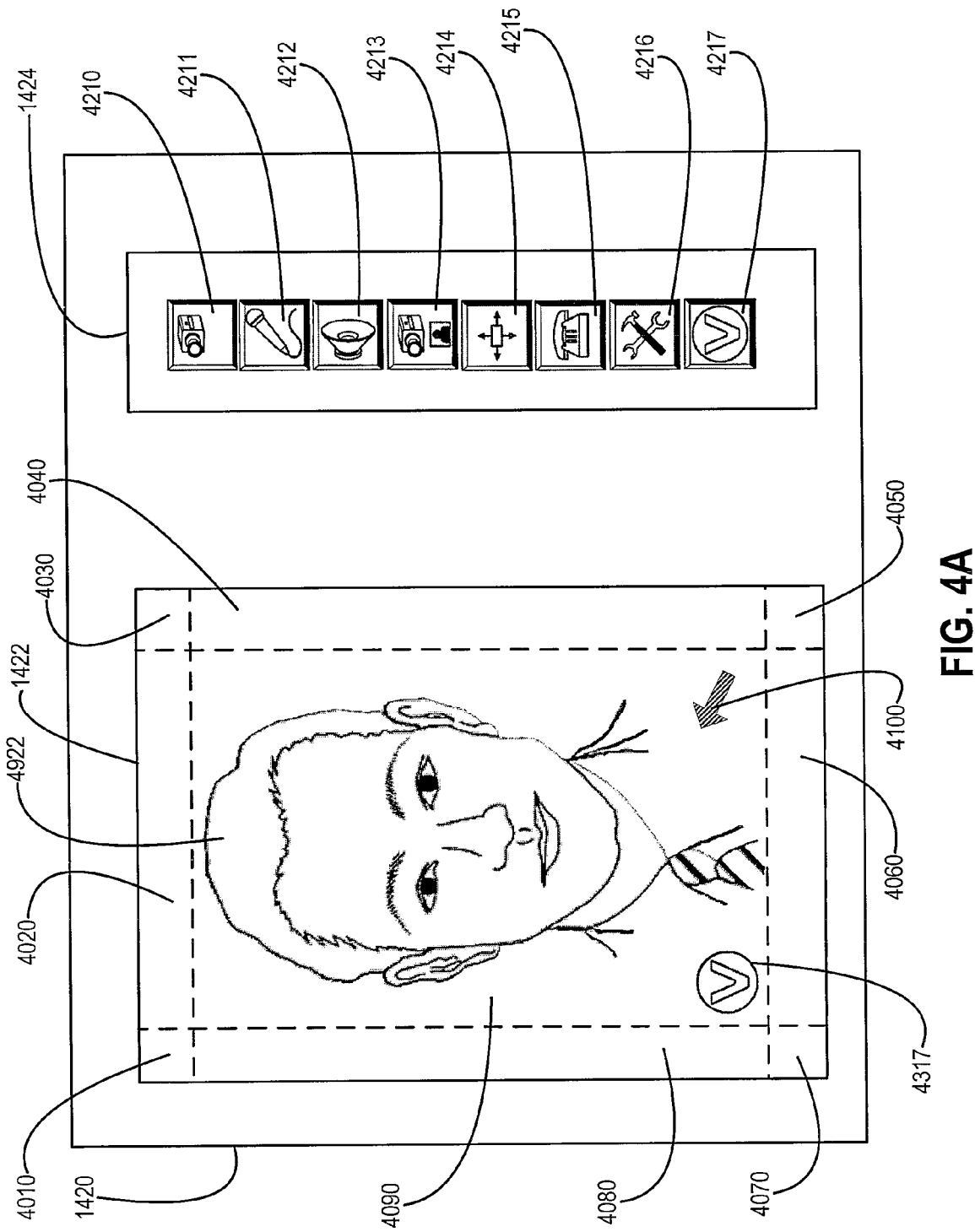
FIG. 4A illustrates a display window of a video conferencing system with icon controls at a local location, according to one or more embodiments.

Turning now to FIG. 4A, a display window of a video conferencing system with control icons at a local location is illustrated, according to one or more embodiments. As shown, participant images or video 4922 of participant 3922 can be displayed via window 1422 and display 1420. In one or more embodiments, APP 2242 can control window 1422 and display images or video from VCS 1200 via window 1422.

As illustrated, APP 2244 can portion window 1422 into multiple regions 4010-4090. In one or more embodiments, a user of VCS 1400 can place a pointer 4100 in a region of regions 4010-4080, the user can select the region, and the selected region can indicate, to APP 2244, a camera control command. For example, selected regions 4010-4080 can indicate, to APP 2244, respective camera control commands: pan left and tilt upwards, tilt upwards, pan right and tilt upwards, pan right, pan right and tilt downwards, pan downwards, pan left and tilt downwards, and pan left.

In one or more embodiments, APP 2244 can determine a position of pointer 4100 within display 1420 and/or window 1422. In one example, APP 2244 can determine the position of pointer 4100 within window 1422 from APP 2242. For instance, APP 2242 can provide the position of pointer 4100 within window 1422 to APP 2244. In another example, APP 2244 can determine the position of pointer 4100 within display 1420 and/or window 1422 from OS 2245. For instance, OS 2045 can provide the position of pointer 4100 within display 1420 and/or window 1422 to APP 2244. In one or more embodiments, the position of pointer 4100 within display 1420 and/or window 1422 to APP 2244 can include one or more coordinates. In one example, the position of pointer 4100 within display 1420 can include one or more coordinates relative to origin coordinates of display 4100. In another example, the position of pointer 4100 within display 1420 can include one or more coordinates relative to origin coordinates of window 1422. In one or more embodiments, APP 2244 can be a background process or one or more portions of APP 2244 can be included in a background process. For example, the background process can be or include a daemon.

In one or more embodiments, APP 2244 can receive data indicating that a user selection of a region of regions 4010-4080 has been made. In one example, the data indicating that the user selection has been made can include information indicating that a mouse button (e.g., a primary mouse button, a secondary mouse button, etc.) has been actuated. In another example, the data indicating that the user selection has been made can include information indicating that a region of regions 4010-4080 has been selected via a touch pad or touchscreen display. For instance, VCS 1400 can be a handheld device (e.g., a PDA, a mobile telephone, a tablet computing device, etc.), where pointer 4100 may be absent, and the user can select a region of regions 4010-4080 with a stylus, finger, etc. For example, a position indicated via the stylus, finger, etc. can be utilized as a position of pointer 4100.

As illustrated, APP 2244 can display icon 4317 within display 1420 and/or window 1422. In one or more embodiments, icon 4317 can be selected by the user to display window 1424 and/or icons 4210-4217. In one example, APP 2244 can determine that icon 4317 was selected by the user and can display window 1424 that includes icons 4210-4217. In another example, VCS 1400 can be a handheld device, and APP 2244 can determine that icon 4317 was selected by the user and can display icons 4210-4217.

In one or more embodiments, APP 2244 can receive user input from the user selecting an icon of icons 4210-4217. When icon 4210 is selected, APP 2244 can toggle camera mute of a local camera (e.g., camera 1450). When icon 4211 is selected, APP 2244 can toggle microphone mute of sound input device 1440. When icon 4212 is selected, APP 2244 can toggle speaker mute of sound output device 1430. When icon 4213 is selected, APP 2244 can provide a command to APP 2242 to toggle between displaying images and/or video from camera 1250 or camera 1450. When icon 4214 is selected, APP 2244 can provide a camera zoom command to VCS 1200. In one example, icon 4214 can be selected with a primary mouse button, and APP 2244 can provide a camera zoom-in command to VCS 1200. In another example, icon 4214 can be selected with a secondary mouse button, and APP 2244 can provide a camera zoom-out command to VCS 1200.

When icon 4215 is selected, APP 2244 can provide a video conference initiation command to APP 2242, if a video conference has not been established, or APP 2244 can provide a video conference termination command to APP 2242, if a video conference has been established. In one or more embodiments, APP 2244 can provide a directory to the user, when icon 4215 is selected, and APP 2244 can provide one or more elements of the directory (e.g., an IP address, a telephone number, a logical network address, a bit rate, a compression algorithm, a communications protocol, a network interfaces, a codec, etc.) that is included in the video conference initiation command to APP 2242. When icon 4216 is selected, APP 2244 can provide a user interface that allows the user to customize and/or modify one or more configurations of APP 2244. When icon 4217 is selected, APP 2244 can hide window 1424 and/or icons 4210-4217.

Figure 4B:
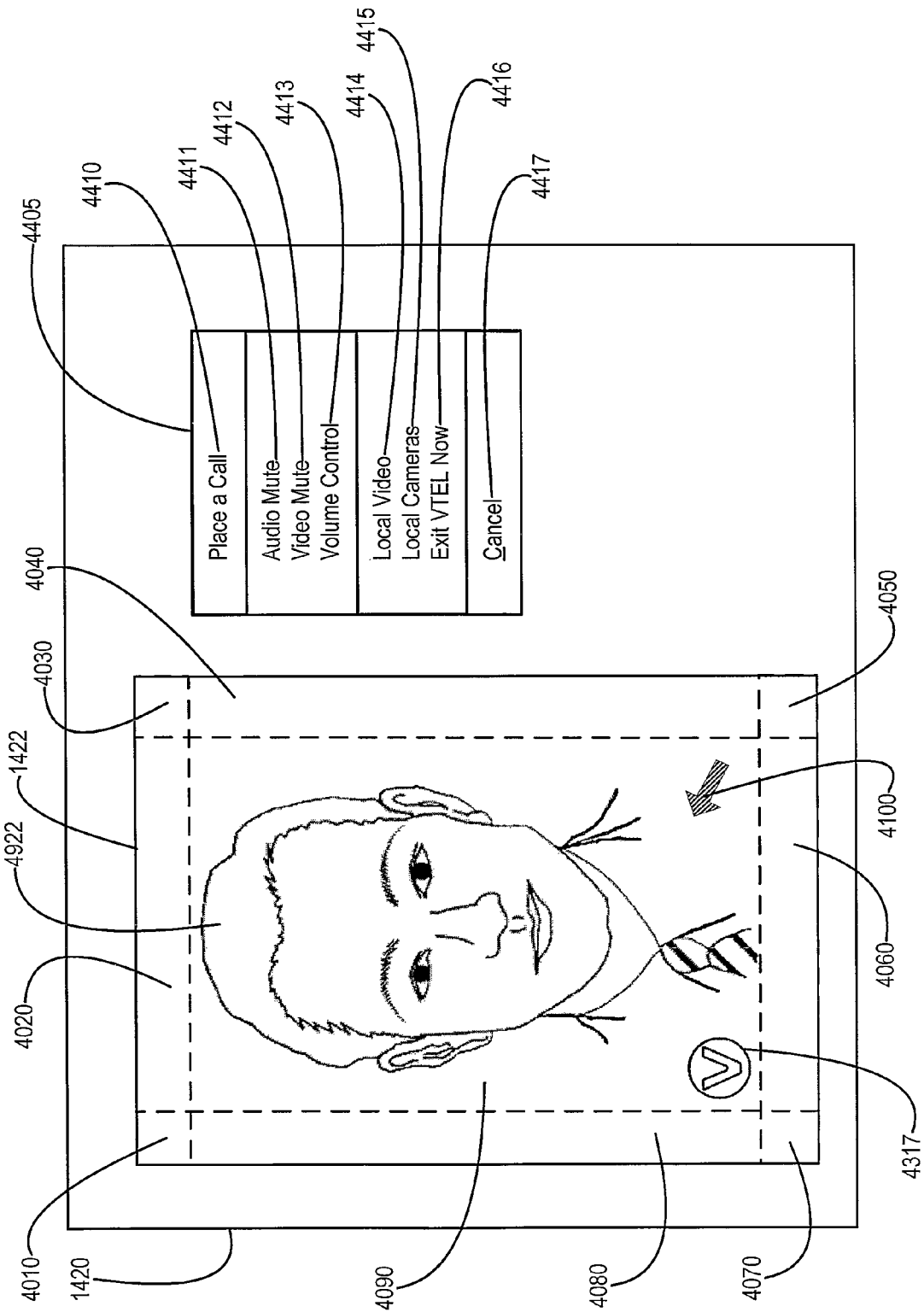
FIG. 4B illustrates a display window of a video conferencing system with menu controls at a local location, according to one or more embodiments.

Turning now to FIG. 4B, a display window of a video conferencing system with menu controls at a local location is illustrated, according to one or more embodiments. As shown, a menu 4405 can be displayed. In one example, menu 4405 can be displayed by APP 2244 in response to a secondary or tertiary mouse button actuation. In second example, menu 4405 can be displayed by APP 2244 in response to a key from a keyboard (e.g., CONTROL, ALT, etc.) and a primary mouse button actuation. In another example, menu 4405 can be displayed by APP 2244 in response to a selection of icon 4317.

As illustrated, one or more of menu items 4410-4417 can be selected via user input to perform one or more of place a call, audio mute, video mute, volume control, local video control, local camera(s) control, exit, and cancel, respectively. When menu item 4410 is selected, APP 2244 can provide a video conference initiation command to APP 2242, if a video conference has not been established. When menu item 4411 is selected, APP 2244 can toggle microphone mute of sound input device 1440. When menu item 4412 is selected, APP 2244 can toggle camera mute of a local camera (e.g., camera 1450). When menu item 4413 is selected, APP 2244 can provide control of a local volume level. When menu item 4414 is selected, APP 2244 can provide control of displaying local video. When menu item 4415 is selected, APP 2244 can provide control of one or more local cameras. When menu item 4416 is selected, APP 2244 can exit or terminate. When menu item 4417 is selected, APP 2244 can cease to display menu 4405.

Figure 4C:
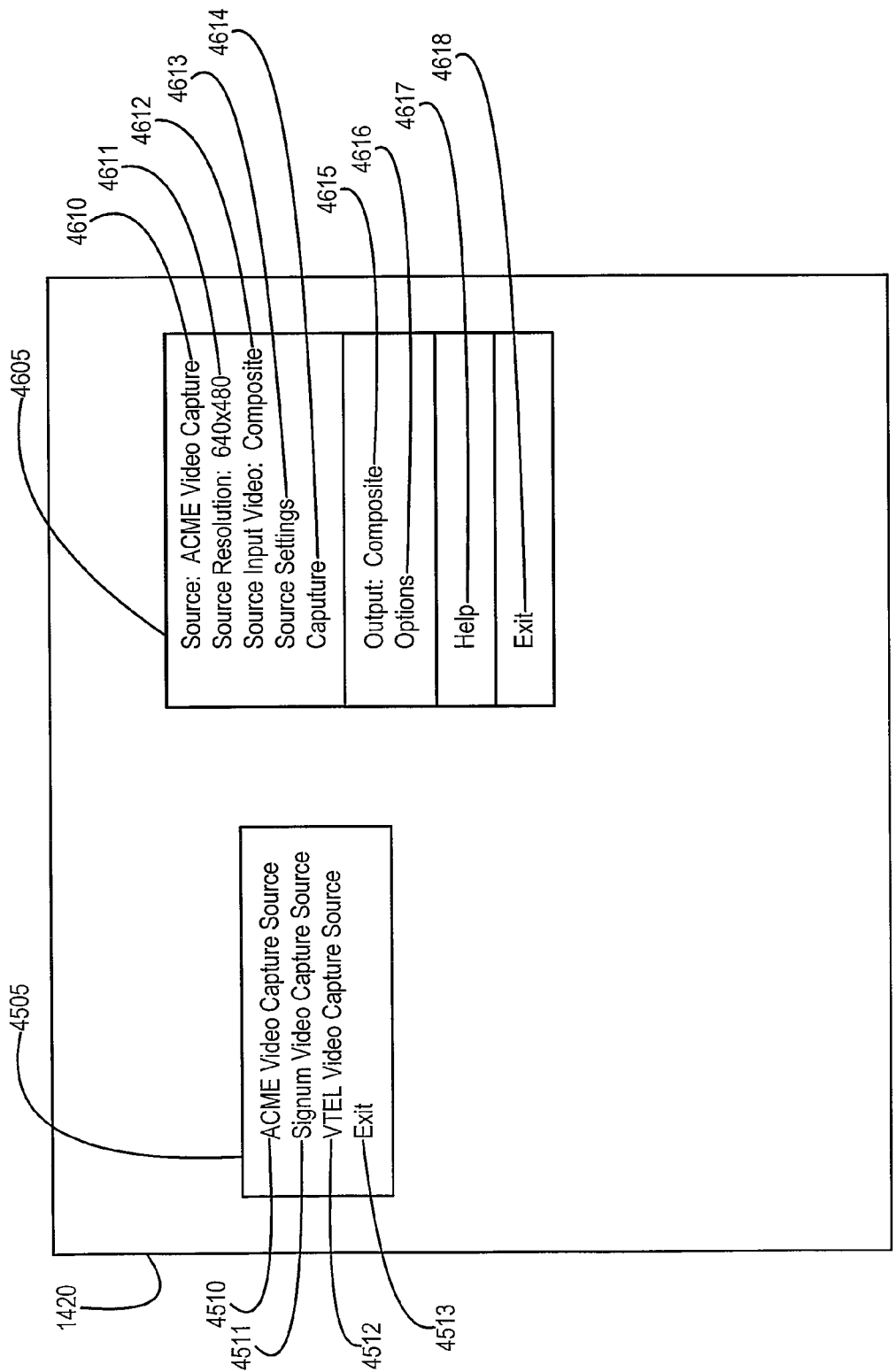
FIG. 4C illustrates configuration menus controls of a video conferencing system at a local location, according to one or more embodiments.

Turning now to FIG. 4C, configuration interfaces are illustrated, according to one or more embodiments. As shown, a menu 4505 can be displayed. In one example, OS 2245 can display menu 4505. In another example, APP 2242 can display menu 4505. For instance, APP 2242 can be configured to use DD 2247, DD 2248, or VDD 2249 via a selection of respective menu items 4510-4512. As illustrated, menu items 4510-4512 can be displayed as camera capture sources "ACME Video Capture Source", "Signum Video Capture Source", and "VTEL Video Capture Source", respectively. In one or more embodiments, menu item 4512 can be selected, via user input, and APP 2242 can utilize VDD 2249. As shown, menu item 4513 can be selected to exit menu 4505.

As illustrated, menu 4605 can be displayed. In one or more embodiments, one or more of APP 2244, VDD 2249, OS 2245, and CFG 2250 can display menu 4605. As illustrated, menu 4605 can include menu items 4610-4618. In one or more embodiments, information associated with VDD 2249 can be conveyed via one or more menu items of menu 4605. For example, one or more of menu items 4610-4612 and 4615 can be utilized to convey setting and/or status information associated with VDD 2249.

In one or more embodiments, VDD 2249 can be configured via menu 4605. For example, one or more of menu items 4610-4613, 4615, and 4616 can be utilized to configure VDD 2249. For instance, menu item 4610 can be utilized to configure a video capture source; menu item 4611 can be utilized to configure a resolution of a video capture source; menu item 4612 can be utilized to configure a source input protocol; menu item 4613 can be utilized to configure other source settings (e.g., a frame rate, a control port, a control protocol, etc.), menu item 4614 can be utilized to toggle whether or not a camera is to capture images; menu item 4615 can be utilized to select an output video protocol; and menu item 4616 can be utilized to configure one or more options. As illustrated, menu item 4617 can be utilized to obtain aid or help, and menu item 4617 can be utilized to exit menu 4605.

Figure 5A:
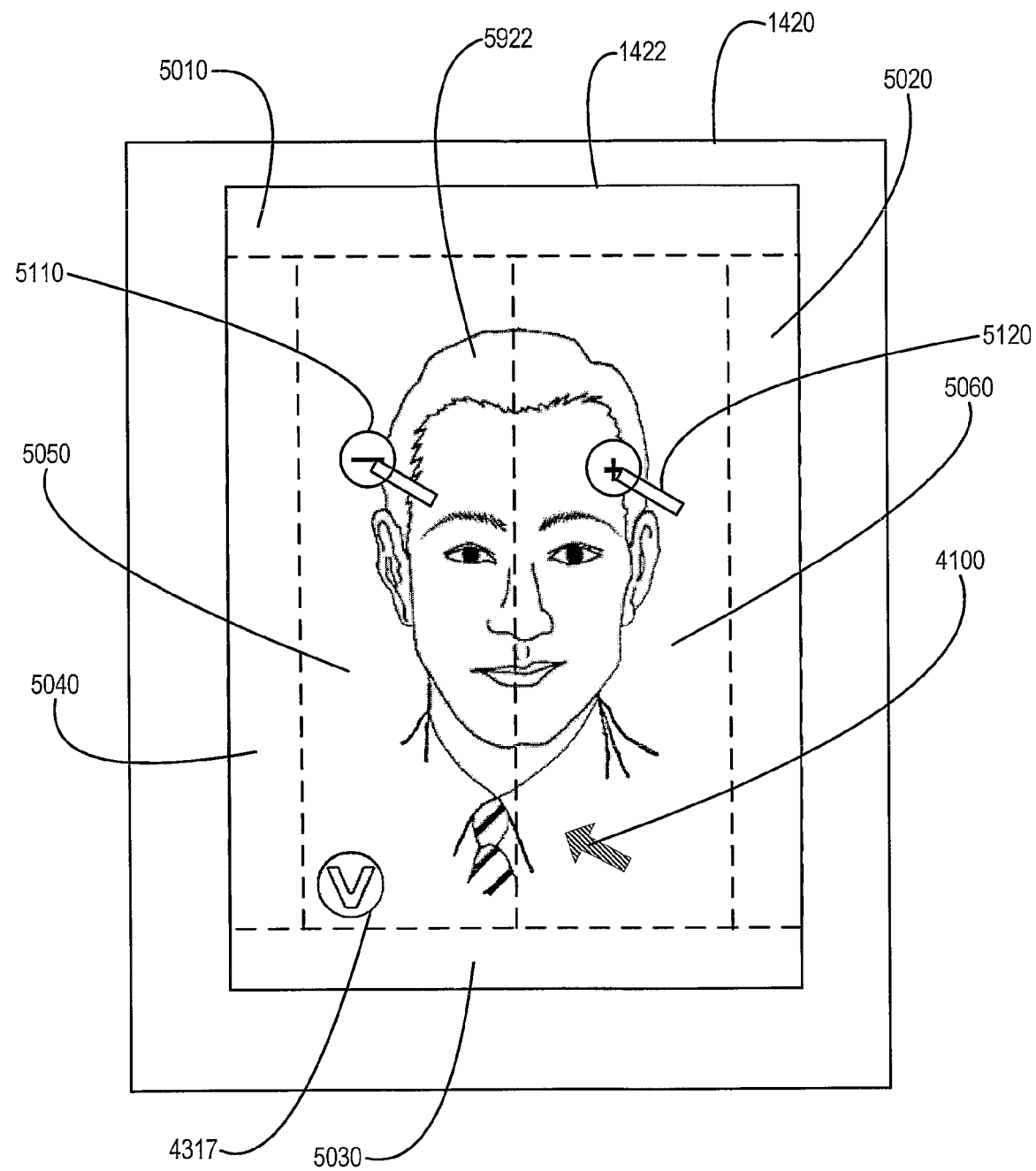
FIG. 5A illustrates a display window of a video conferencing system at a local location, according to one or more embodiments.

Turning now to FIG. 5A, a display window of a video conferencing system at a local location is illustrated, according to one or more embodiments. As shown, participant images or video 5922 of participant 3922 can be displayed via window 1422 and display 1420. In one or more embodiments, APP 2242 can control window 1422 and display images or video from VCS 1200 via window 1422.

As illustrated, APP 2244 can portion window 1422 into multiple regions 5010-5060. In one or more embodiments, a user of VCS 1400 can place pointer 4100 in a region of regions 5010-5060, the user can select the region, and the selected region can indicate, to APP 2244, a camera control command. For example, selected regions 5010-5060 can indicate, to APP 2244, respective camera control commands: tilt upwards, pan right, tilt downwards, pan left, zoom-out, and zoom-in. In one or more embodiments, when APP 2244 determines that pointer 4100 is within region 5050 or region 5060, respective icons 5110 or 5120 can be displayed to indicate respective zoom-out or zoom-in camera commands.

In one or more embodiments, one or more systems, processes, and/or methods described herein can function without a display window. For example, one or more systems, processes, and/or methods described herein can function without window 1422 associated with APP 2242. For instance, APP 2242 can display images or video from VCS 1200 via display 1420 without window 1422. In one or more embodiments, VCS 1400 can include a PDA, a smart phone, a tablet computing device, etc.; APP 2242 can display images or video from VCS 1200 via display 1420 without window 1422; and APP 2244 can determine one or more regions of display 1420 selected by a user as if APP 2244 were to determine one or more regions of window 1422.

Figure 5C:
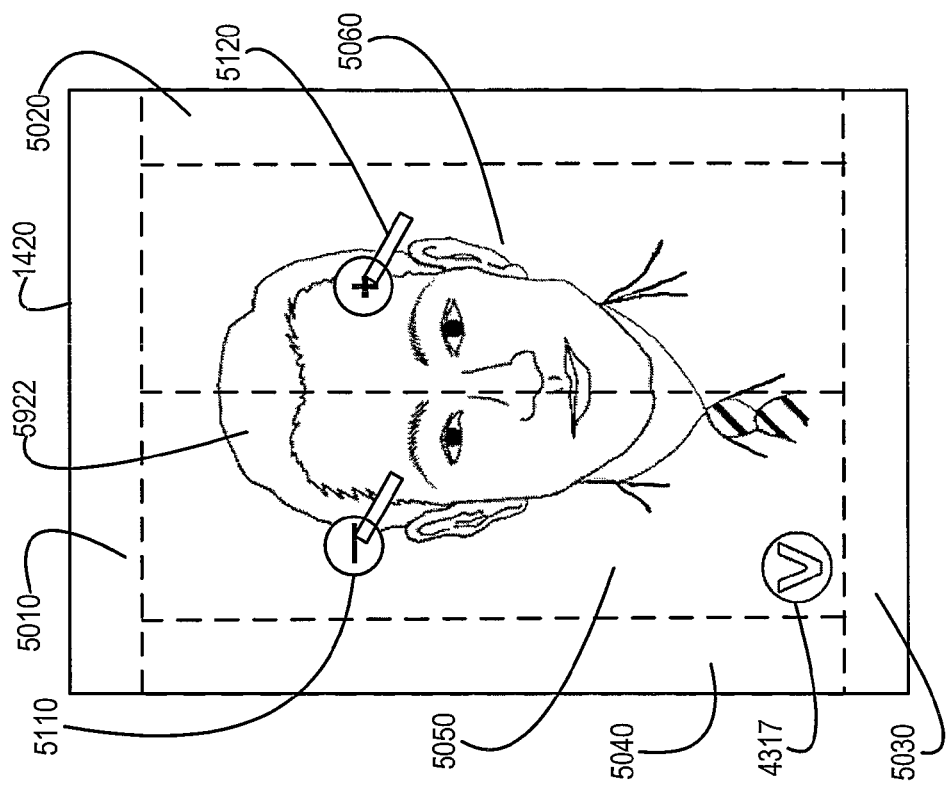
FIG. 5C illustrates a display of a video conferencing system, according to one or more embodiments.
Figure 5B:
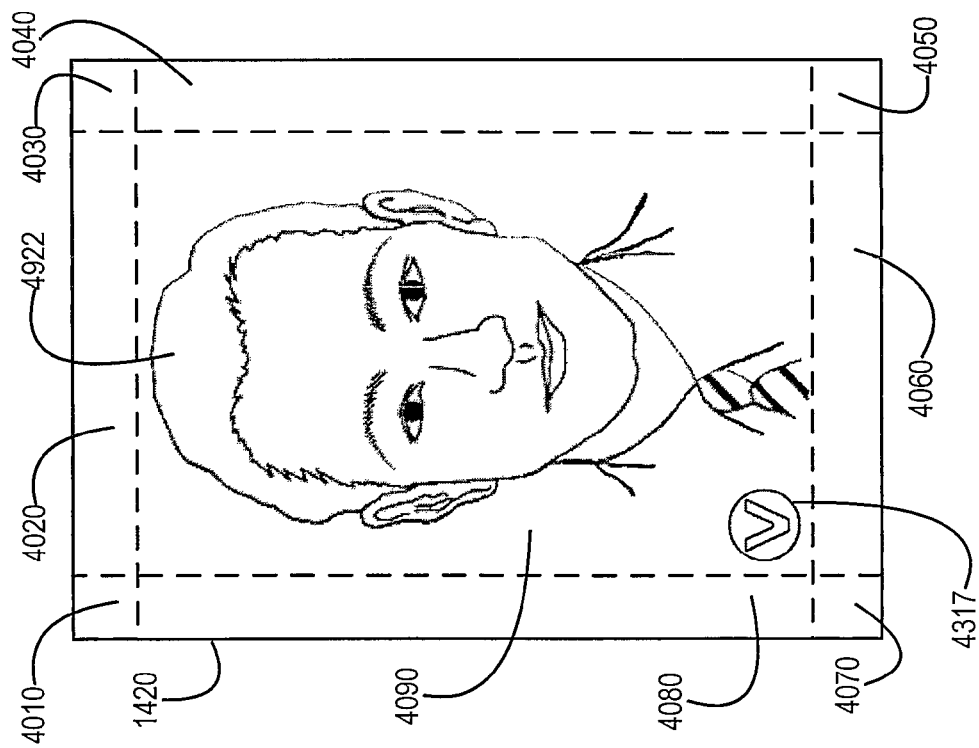
FIG. 5B illustrates a display of a video conferencing system, according to one or more embodiments.

In one example as illustrated in FIG. 5B, APP 2244 can portion display 1420 (e.g., a touch-screen display) into multiple regions 4010-4090. In one or more embodiments, a user of VCS 1400 can select a region of regions 4010-4080, and the selected region can indicate, to APP 2244, a camera control command. For example, the user of VCS 1400 can select a region of regions 4010-4080 using a digit (e.g., a finger), a stylus, etc. For instance, selected regions 4010-4080 can indicate, to APP 2244, respective camera control commands: pan left and tilt upwards, tilt upwards, pan right and tilt upwards, pan right, pan right and tilt downwards, pan downwards, pan left and tilt downwards, and pan left.

In another example as illustrated in FIG. 5C, APP 2244 can portion display 1420 (e.g., a touch-screen display) into multiple regions 5010-5060. In one or more embodiments, a user of VCS 1400 can select a region of regions 5010-5060, and the selected region can indicate, to APP 2244, a camera control command. For example, the user of VCS 1400 can select a region of regions 4010-4080 using a digit (e.g., a finger), a stylus, etc. For instance, selected regions 5010-5060 can indicate, to APP 2244, respective camera control commands: tilt upwards, pan right, tilt downwards, pan left, zoom-out, and zoom-in. In one or more embodiments, when APP 2244 determines that pointer 4100 is within region 5050 or region 5060, respective icons 5110 or 5120 can be displayed to indicate respective zoom-out or zoom-in camera commands.

Figure 6:
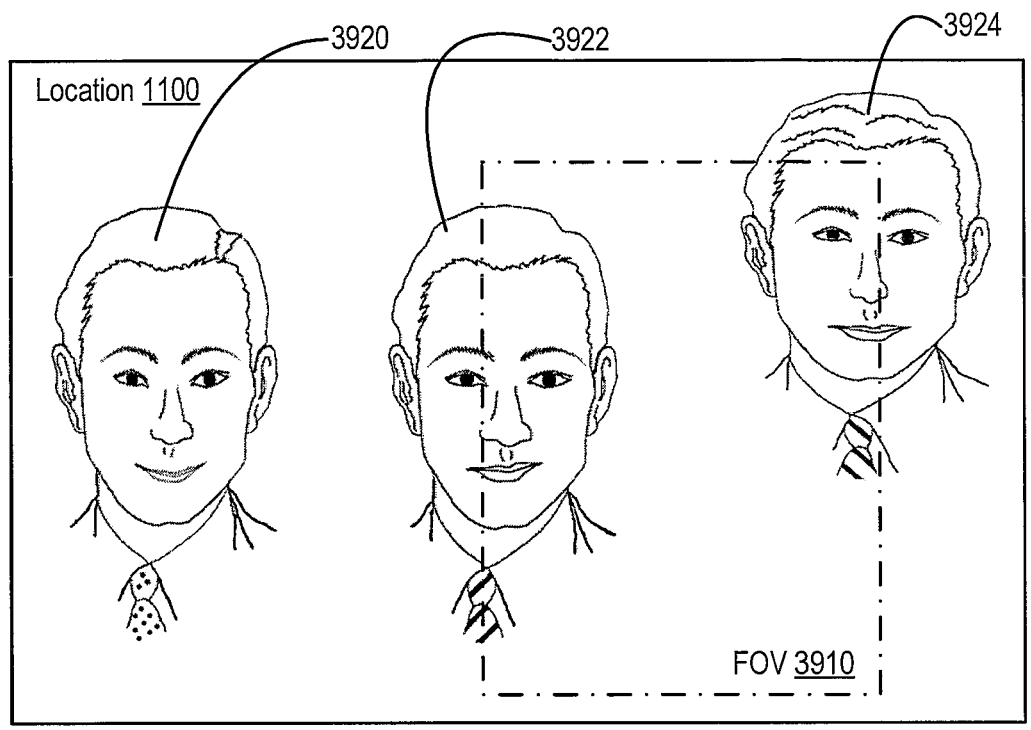
FIG. 6 illustrates a field of view at a remote location and a display window of a video conferencing system at a local location, according to one or more embodiments.
Figure 6:
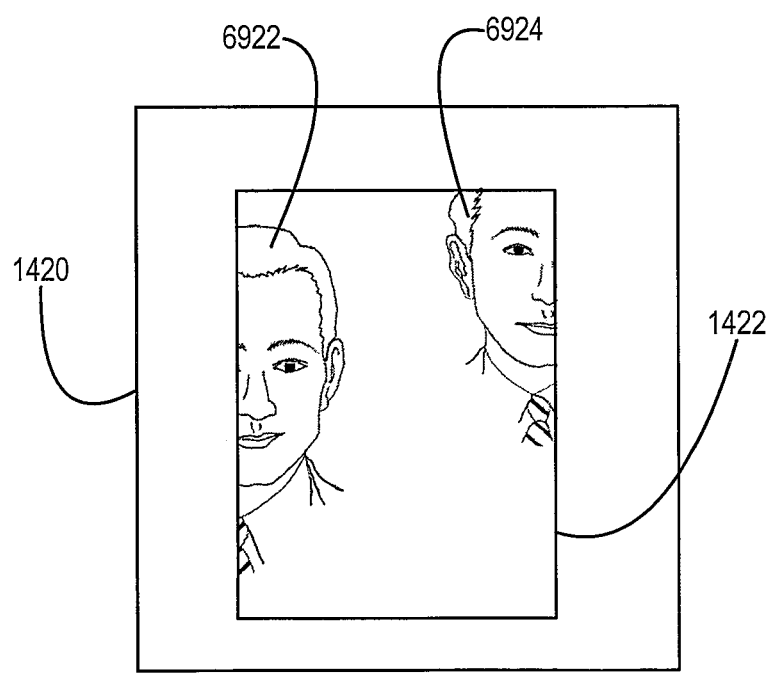

Turning now to FIG. 6, a field of view at a remote location and a display window of a video conferencing system at a local location are illustrated, according to one or more embodiments. As shown, camera 1250 was panned right (from its position associated with FIG. 3), and FOV 3910 captures images and/or video of portions of participants 3922 and 3924. In one example, a user of VCS 1400 selected region 4040 of window 1422, and APP 2244 sent a camera control command to VCS 1200 which panned camera 1250 right. In another example, a user of VCS 1400 selected region 5020 of window 1422, and APP 2244 sent a camera control command to VCS 1200 which panned camera 1250 right. As shown, participant images or video 6922 of participant 3922 and participant images or video 6924 of participant 3924 can be displayed via window 1422 and/or display 1420.

Figure 7:
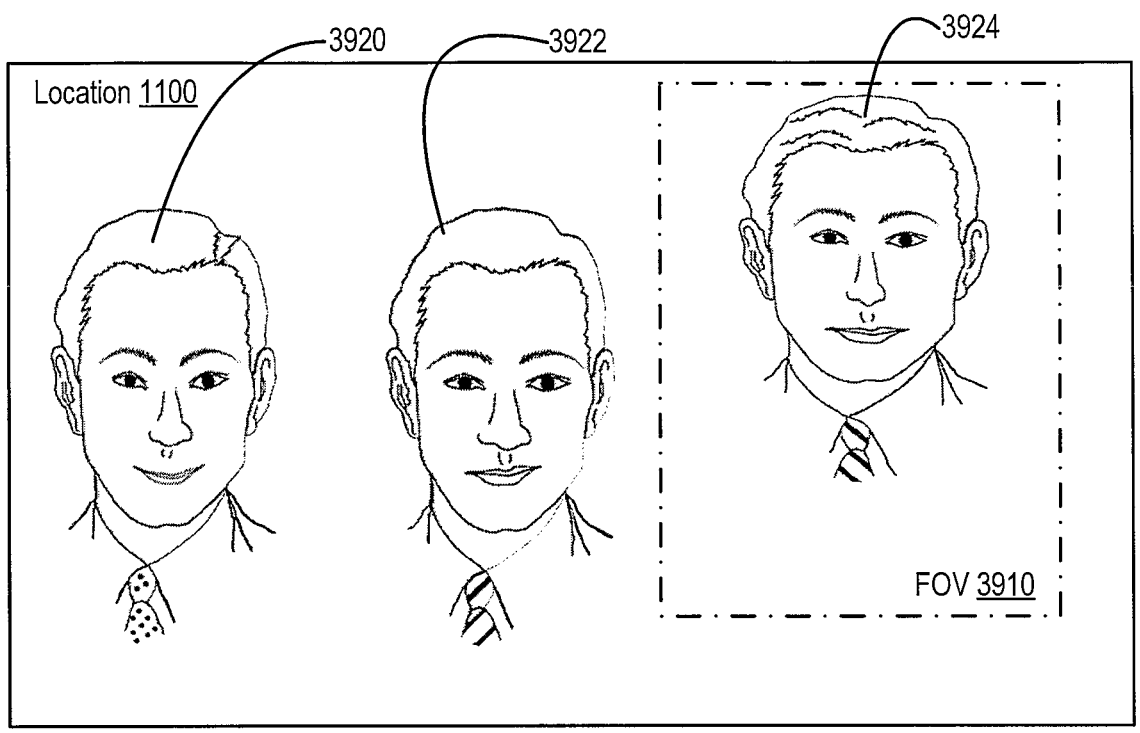
FIG. 7 illustrates a field of view at a remote location and a display window of a video conferencing system at a local location, according to one or more embodiments.
Figure 7:
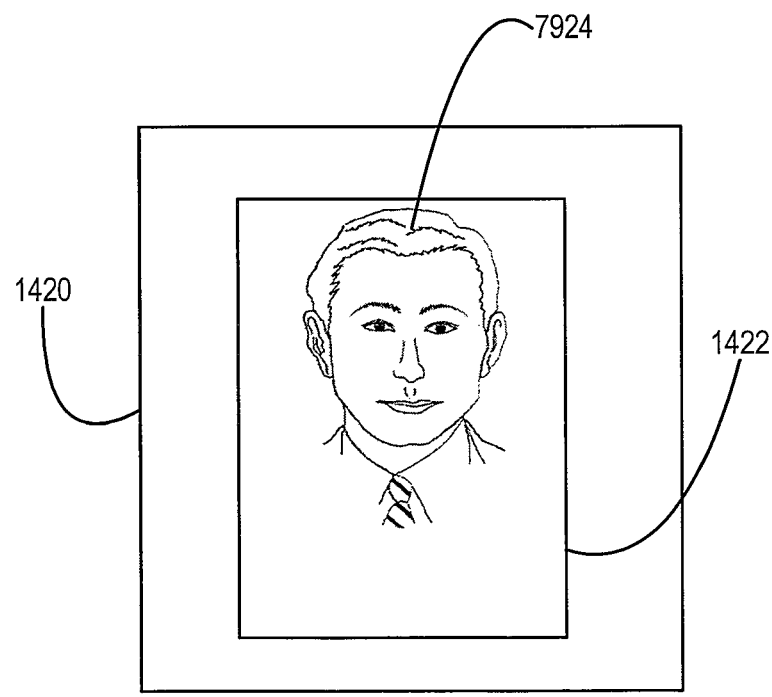

Turning now to FIG. 7, a field of view at a remote location and a display window of a video conferencing system at a local location are illustrated, according to one or more embodiments. As shown, camera 1250 was panned right and tilted upwards (from its position associated with FIG. 6), and FOV 3910 captures images and/or video of participant 3924. In one example, a user of VCS 1400 selected region 4030 of window 1422, and APP 2244 sent one or more camera control commands to VCS 1200 which panned camera 1250 right and tilted camera 1250 upwards. In another example, a user of VCS 1400 selected regions 5020 and 5010 of window 1422, and APP 2244 sent one or more camera control commands to VCS 1200 which panned camera 1250 right and tilted camera 1250 upwards. As shown, participant images or video 7924 of participant 3924 can be displayed via window 1422 and/or display 1420.

Figure 8:
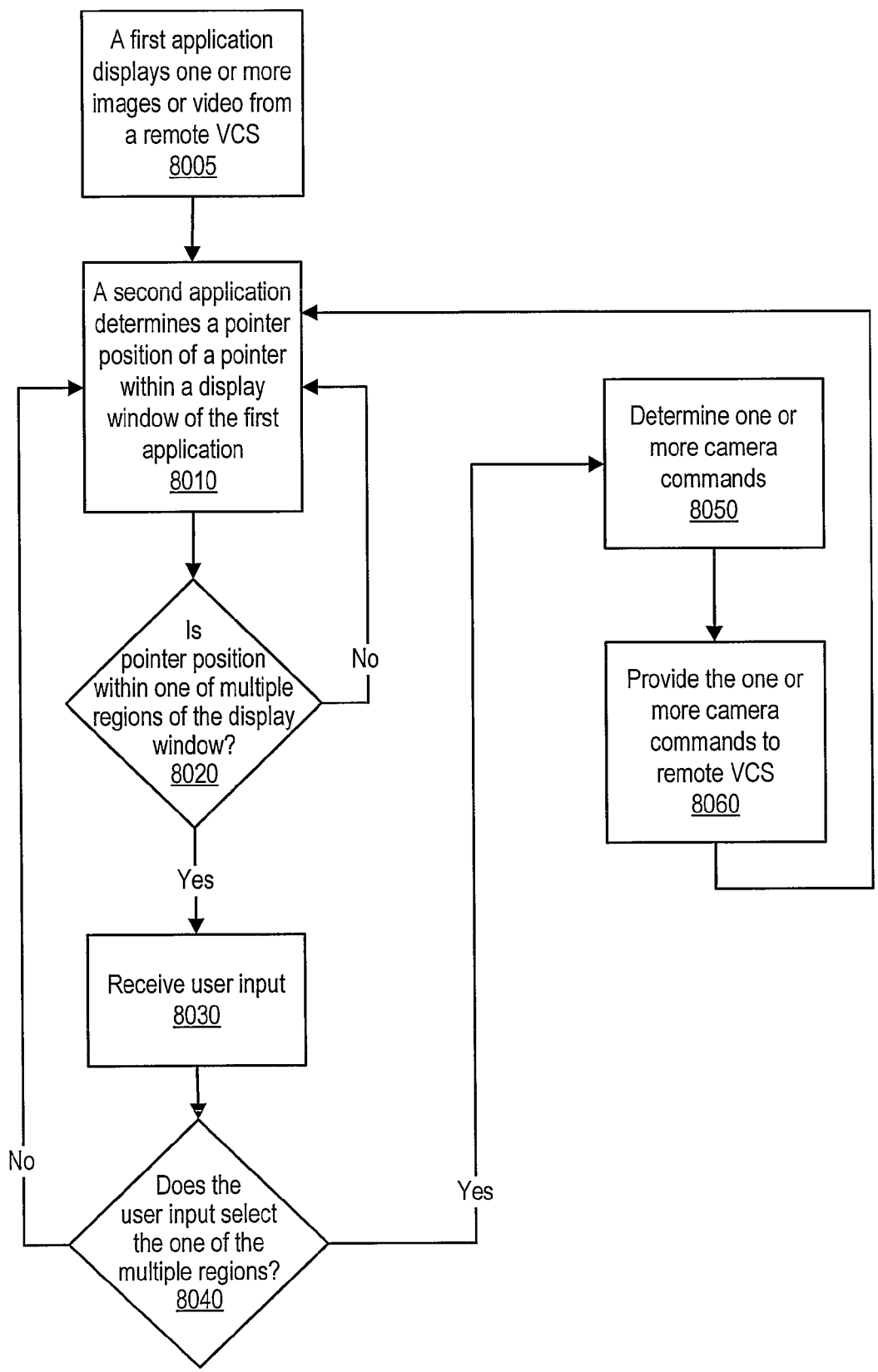
FIG. 8 illustrates a method of operating a video conference system, according to one or more embodiments.

Turning now to FIG. 8, a method of operating a video conference system is illustrated, according to one or more embodiments. At 8005, a first application can display one or more images or video from a remote VCS. For example, APP 2242 can display, in window 1422, video from VCS 1200. At 8010, a second application can determine a pointer position of a pointer within a display window of the first application. For example, APP 2244 can determine a pointer position of a pointer within window 1422 of APP 2242. At 8020, the second application can determine whether or not the pointer position is within one of multiple regions of the display window. In one example, APP 2244 can determine whether or not a position of pointer 4100 is within a region of regions 4010-4080 of window 1422. In another example, APP 2244 can determine whether or not a position of pointer 4100 is within a region of regions 5010-5060 of window 1422.

In one or more embodiments, the position of pointer 4100 within display 1420 or window 1422 can include one or more coordinates relative to origin coordinates of display 1420 or window 1422, respectively. For example, APP 2244 can determine whether or not a position of pointer 4100 is within a region of regions 4010-4080 or regions 5010-5060 based on one or more coordinates relative to origin coordinates of display 1420 or window 1422. In one or more embodiments, pointer 4100 may be absent, and the position of pointer 4100 within display 1420 or window 1422 can be based on user input from a touch-screen display. For example, the user input from the touch-screen display can include or can be transformed into one or more coordinates relative to origin coordinates of display 1420 or window 1422 that can be utilized in determining a user-selected region of regions 4010-4080 or regions 5010-5060.

If the pointer position is not within one of multiple regions of the display window, the method can proceed to 8010. If the pointer position is within one of multiple regions of the display window, the second application can receive user input at 8030. For example, APP 2244 can receive the user input. For instance, the user input can include data that indicates a selection (e.g., an actuation of a mouse button, an actuation of a key of a keyboard, a touch on a touch screen, etc.). At 8040, the second application can determine whether or not the user input selects the region of the multiple regions. In one example, APP 2244 can determine whether or not the user input selects a region of regions 4010-4080 of window 1422. In another example, APP 2244 can determine whether or not the user input selects a region of regions 5010-5060 of window 1422.

If the user input does not select one of the multiple regions, the method can proceed to 8010. If the user input selects one of the multiple regions, the second application can determine one or more camera commands at 8050. For example, APP 2244 can determine one or more camera commands based on the selected region (e.g., a selected region of regions 4010-4080 or regions 5010-5060). In one or more embodiments, the one or more camera commands can include one or more of tilt upwards, tilt downwards, pan right, pan left, zoom in, and zoom out. In one or more embodiments, the one or more camera commands can include one or more combinations of tilt upwards, tilt downwards, pan right, pan left, zoom in, and zoom out. At 8060, the second application can provide the one or more one camera commands to the remote VCS. For example, APP 2244 can provide the one or more one camera commands to VCS 1200 via network 1010. In one or more embodiments, APP 2244 can provide the one or more one camera commands to VCS 1200 via a data channel that is different than a data channel that is used for the video data. In one or more embodiments, the method can proceed to 8010.

Figure 9:
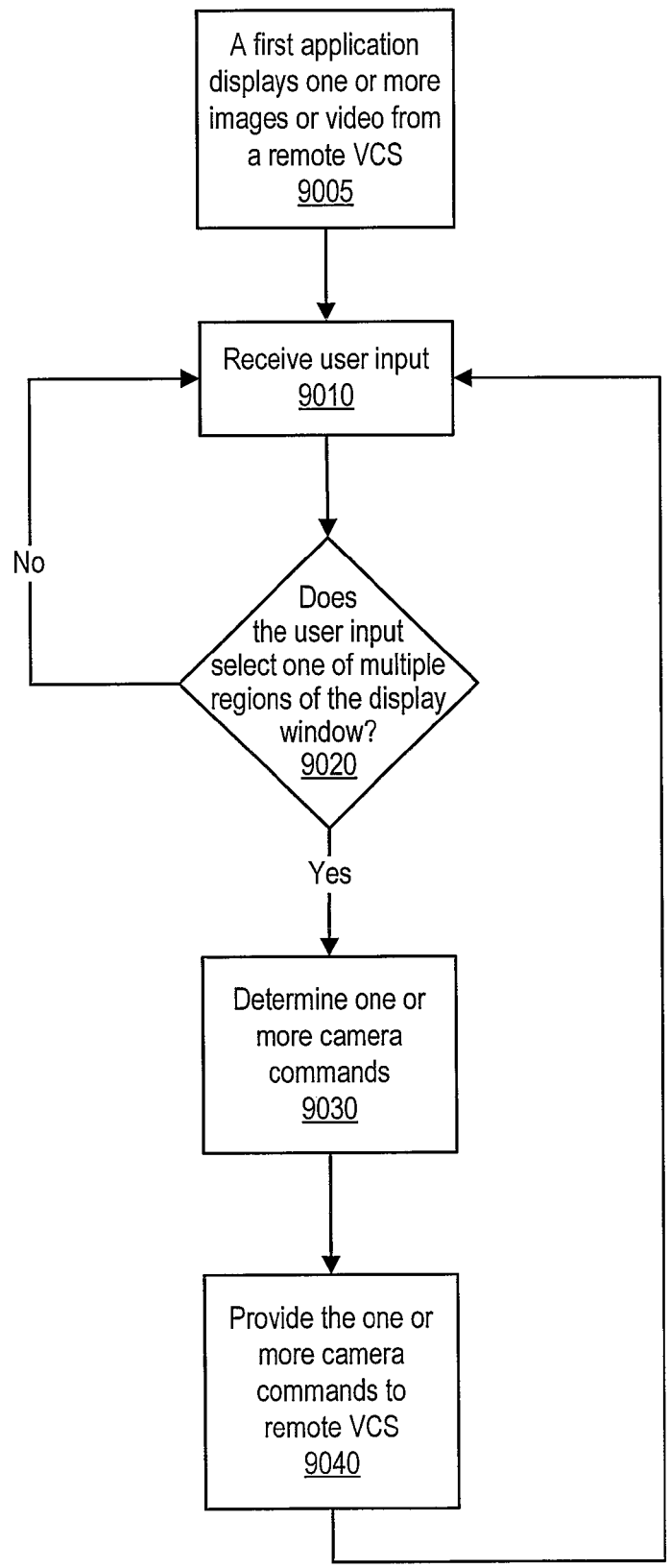
FIG. 9 illustrates a method of operating a video conference system that includes a handheld device, according to one or more embodiments.

Turning now to FIG. 9, a method of operating a video conference system from a handheld device is illustrated, according to one or more embodiments. At 9005, a first application can display one or more images or video from a remote VCS. For example, APP 2242 can display, in window 1422, video from VCS 1200. At 9010, a second application can receive user input. For example, the user input can include data that indicates a selection (e.g., a touch on a touch screen, etc.) of a region of a display window of a second application. For instance, APP 2244 can receive the user input that can indicate a region of multiple regions of window 1422 of APP 2242. At 9020, the second application can determine whether or not the user input selects the region of the multiple regions of the display window of the second application. In one example, APP 2244 can determine whether or not the user input selects a region of regions 4010-4080 of window 1422. In another example, APP 2244 can determine whether or not the user input selects a region of regions 5010-5060 of window 1422. In one or more embodiments, user input from the touch-screen display can include or can be transformed into one or more coordinates relative to origin coordinates of display 1420 or window 1422 that can be utilized in determining a user-selected region of regions 4010-4080 or regions 5010-5060.

If the user input does not select one of the multiple regions, the method can proceed to 9010. If the user input selects one of the multiple regions, the second application can determine one or more camera commands at 9030. For example, APP 2244 can determine one or more camera commands based on the selected region (e.g., a selected region of regions 4010-4080 or regions 5010-5060). In one or more embodiments, the one or more camera commands can include one or more of tilt upwards, tilt downwards, pan right, pan left, zoom in, and zoom out. In one or more embodiments, the one or more camera commands can include one or more combinations of tilt upwards, tilt downwards, pan right, pan left, zoom in, and zoom out. At 9040, the second application can provide the one or more one camera commands to the remote VCS. For example, APP 2244 can provide the one or more one camera commands to VCS 1200 via network 1010. In one or more embodiments, APP 2244 can provide the one or more one camera commands to VCS 1200 via a data channel that is different than a data channel that is used for the video data. In one or more embodiments, the method can proceed to 9010.

Figure 10:
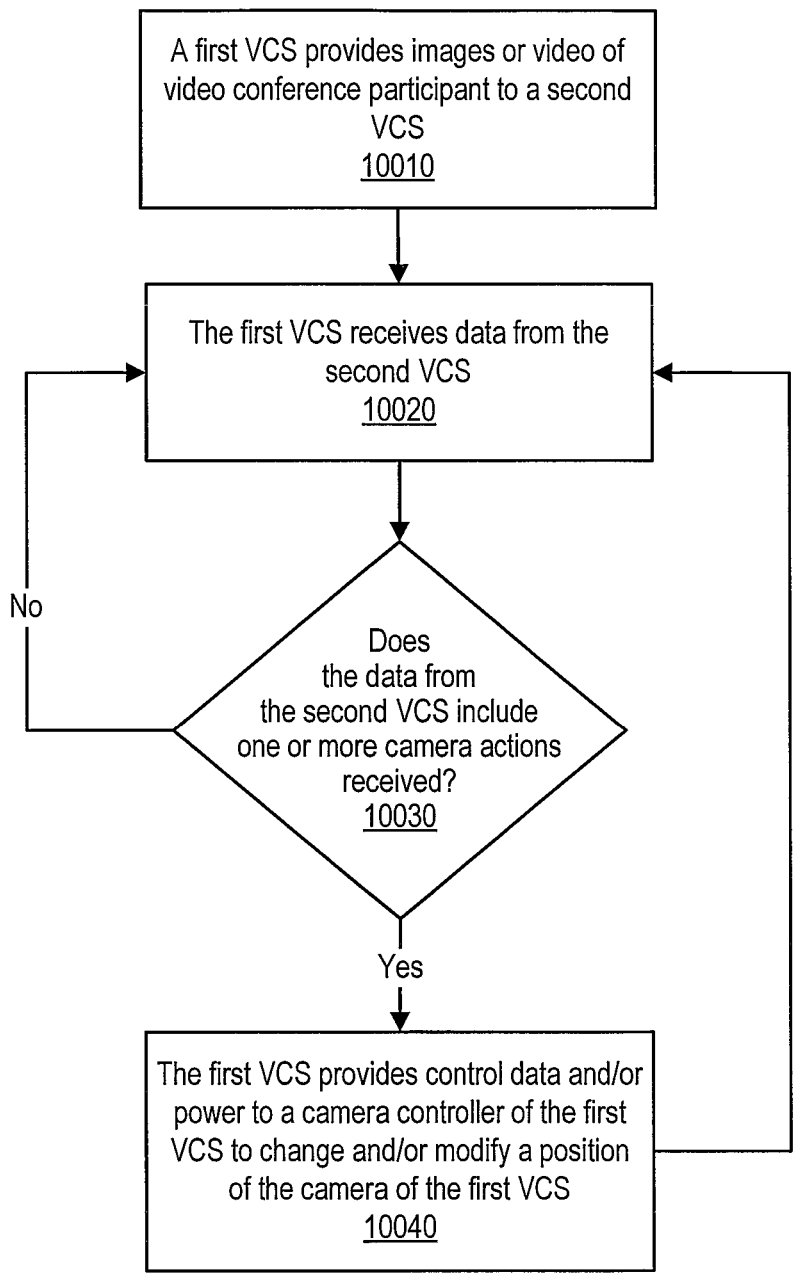
FIG. 10 illustrates a method of operating a video conference system, according to one or more embodiments.

Turning now to FIG. 10, a method of operating a video conference system is illustrated, according to one or more embodiments. At 10010, a first VCS at a first location can provide images or video of one or more video conference participants to a second VCS at a second location. For example, APP 2042 of VCS 1200 at location 1100 can provide images or video of one or more of participants 3920-3924 to APP 2242 of VCS 1400 at location 1300. At 10020, the first VCS can receive data from the second VCS via a network. For example, VCS 1200 can receive data from VCS 1400 via network 1010. In one or more embodiments, the first VCS can receive data via a H.323 protocol. For example, APP 2042 or APP 2044 can receive the data from VCS 1400 via the H.323 protocol. In one or more embodiments, the data from the second VCS can include one or more camera control commands.

At 10030, the first VCS can determine whether or not the data from the second VCS includes one or more camera control commands. For example, APP 2042 or APP 2044 of VCS 1200 can determine whether or not data from VCS 1400 includes one or more camera control commands. If the data from the second VCS does not include one or more camera control commands, the method can proceed to 10010. If the data from the second VCS includes one or more camera control commands, the first VCS can provide control data and/or power to a camera controller of the first VCS to change and/or modify a position of a camera of the first VCS at 10040. For example, APP 2042 or APP 2044 of VCS 1200 can provide control data and/or power to camera controller 1260 to change and/or modify a position of camera 1250. For example, APP 2042 or APP 2044 of VCS 1200 can provide control data to camera controller 1260 to change and/or modify a position of camera 1250 via at least one of a USB, a UART, an IEEE 1394 bus, a wired Ethernet, a DVI, a HDMI, a VGA interface, a composite video interface, a SPI bus, an I$^2$C bus, a SMB, a PCI, and a PCIe, among others.

In one or more embodiments, one or more structures and/or functionalities described with reference to APP 2244 can be included in VDD 2249. In one example, VDD 2249 can provide one or more camera commands to a remote VCS. In another example, VDD 2249 can determine whether or not user input selects one of multiple regions of a display window of a video conference application. For instance, VDD 2249 can receive data from APP 2244 that indicates that user input selects one of multiple regions of a display window of a video conference application.

Figure 11:
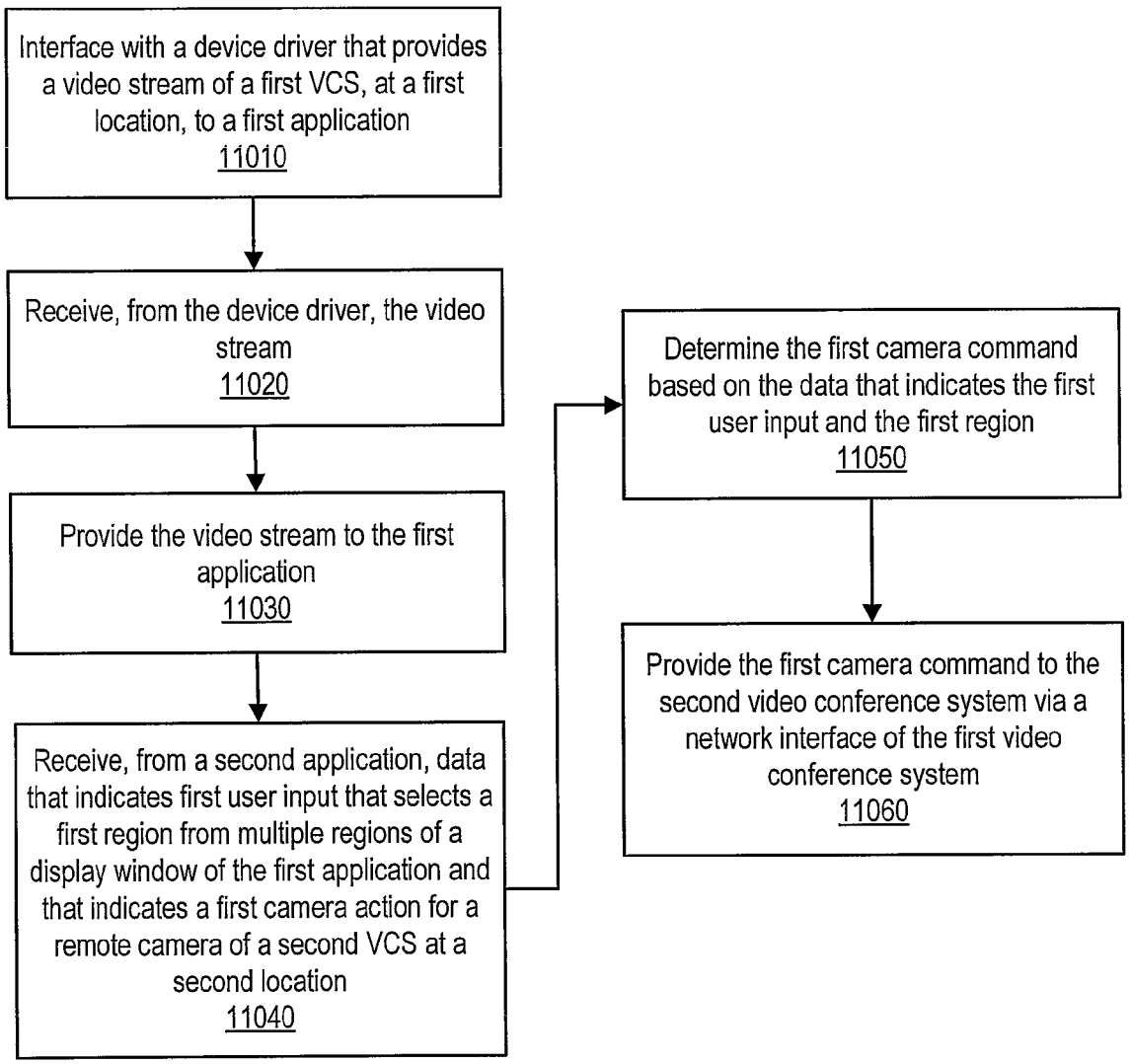
FIG. 11 illustrates a method of operating a virtual device driver, according to one or more embodiments.

Turning now to FIG. 11, a method of operating a virtual device driver is illustrated, according to one or more embodiments. At 11010, VDD 2249 can interface a device driver (e.g., DD 2247, DD 248, etc.) that provides a video stream of camera 1450 of VCS 1400 to a video conference application (e.g., APP 2242). At 11020, VDD 2249 can receive the video stream from the device driver. In one or more embodiments, the video conference application can lack an ability and/or a functionality to receive the video stream via a first protocol and can include an ability and/or a functionality to receive the video stream via a second protocol, different from the first protocol, and VDD 2249 can transform the video stream from the first protocol to the second protocol.

At 11030, VDD 2249 can provide the video stream to the video conference application. In one or more embodiments, VDD 2249 can provide the video stream to the video conference application via the second protocol. At 11040, VDD 2249 can receive data that indicates user input that selects a first region of multiple regions of a display window of the video conference application. For example, the user input can indicate a first camera action for a remote camera of VCS 1200. For instance, the first camera action for the remote camera can be a first action for camera controller 1260 of VCS 1200. At 11050, VDD 2249 can determine a first camera command based on the data that indicates the user input and the first region. At 11060, VDD 2249 can provide the first camera command to VCS 1200 via a network interface of VCS 1400. For example, VDD 2249 can provide the first camera command to VCS 1200 via interface 2220 (e.g., a network interface configured to be coupled to network 1010).

Figure 12:
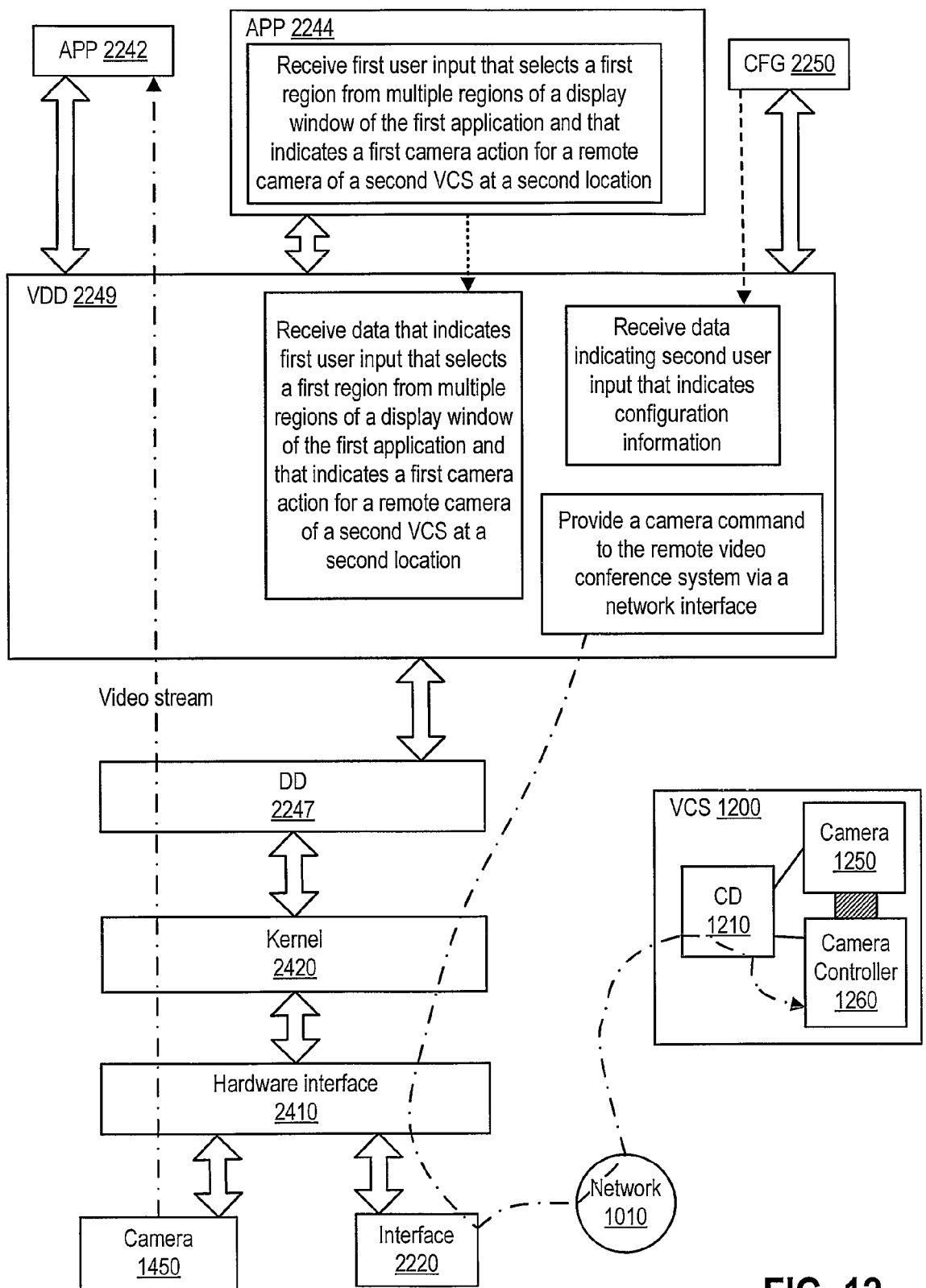
FIG. 12 illustrates an exemplary block diagram of a model, according to one or more embodiments.

Turning now to FIG. 12, an exemplary a block diagram a model is illustrated, according to one or more embodiments. As shown, APP 2242 (e.g., a video conference application) can receive a video stream from camera 1450 via hardware interface 2410, kernel 2420, DD 2247, and VDD 2249. In one or more embodiments, APP 2244 can receive user input that selects a first region of multiple regions of a display window of APP 2242 and that indicates a camera action for a remote camera of VCS 1200, and VDD 2249 can receive, from APP 2244, data that indicates the user input that selects the first region and that indicates the camera action for the remote camera of VCS 1200.

As illustrated, VDD 2249 can receive, from CFG 2250, data indicating user input that indicates configuration information. In one example, the configuration information can be utilized to configure one or more of a video capture source, a resolution of a video capture source, a source input protocol, and other source settings (e.g., a frame rate, a control port, a control protocol, etc.), among others. In another example, the configuration information can be utilized to toggle whether or not a camera is to capture images, to select an output video protocol, and to configure one or more options, among others. As shown, VDD 2249 can provide a camera command to VCS 1200 via interface 2220 and network 1010. For example, VDD 2249 can provide the camera command camera controller 1260, as illustrated.

Figure 13:
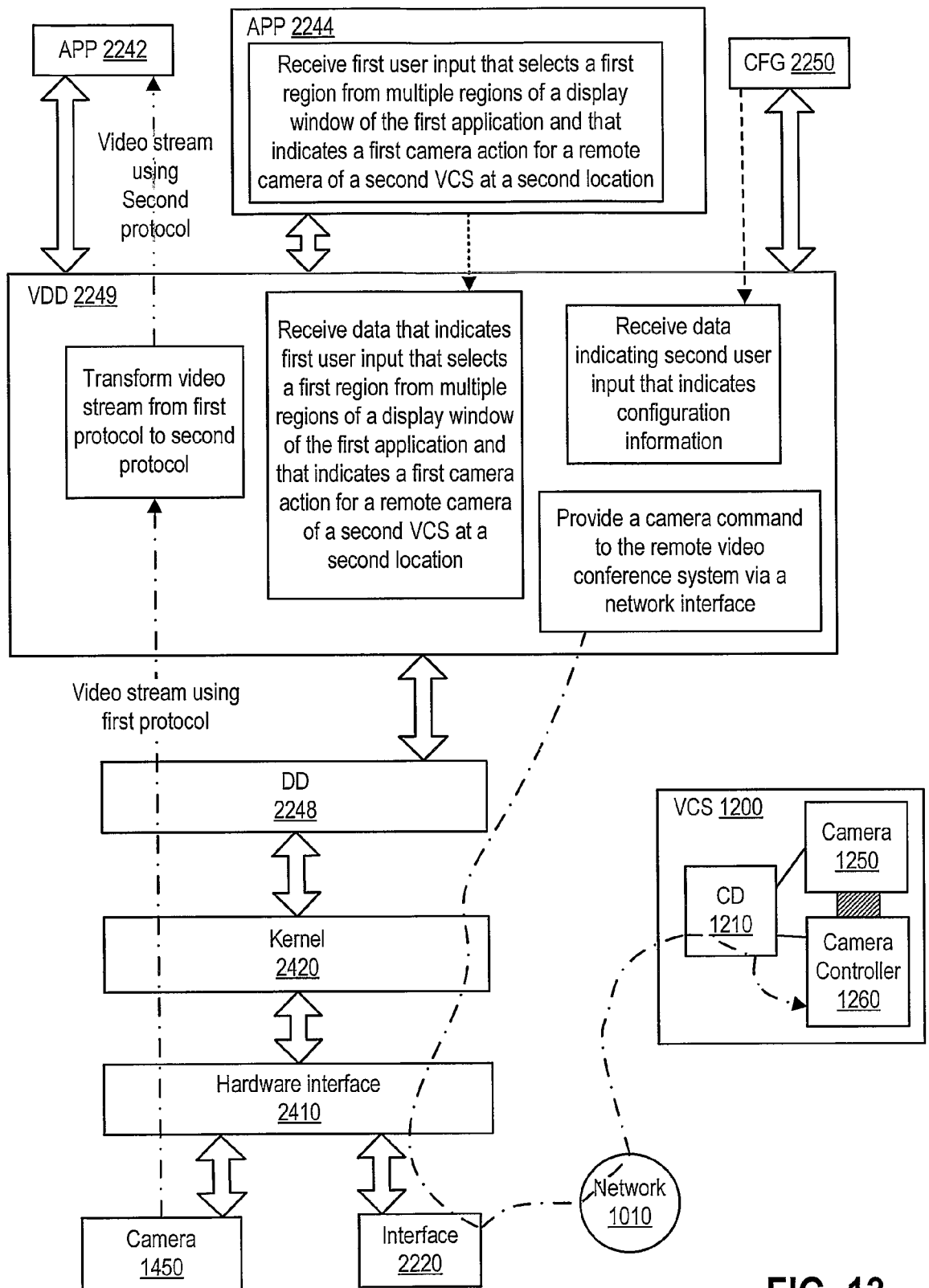
FIG. 13 illustrates an exemplary block diagram of another model, according to one or more embodiments.

Turning now to FIG. 13, an exemplary a block diagram another model is illustrated, according to one or more embodiments. As shown, VDD 2249 can receive a video stream, utilizing a first protocol, from camera 1450 via hardware interface 2410, kernel 2420, and DD 2248. In one or more embodiments, VDD 2249 can transform the video stream that utilizes a first protocol to a video stream that utilizes a second protocol. For example, APP 2242 (e.g., a video conference application) can receive a video stream that utilizes the second protocol. As illustrated, APP 2242 can receive the video stream that utilizes the second protocol from VDD 2249.

In one or more embodiments, APP 2244 can receive user input that selects a first region of multiple regions of a display window of APP 2242 and that indicates a camera action for a remote camera of VCS 1200, and VDD 2249 can receive, from APP 2244, data that indicates the user input that selects the first region and that indicates the camera action for the remote camera of VCS 1200. As illustrated, VDD 2249 can receive, from CFG 2250, data indicating user input that indicates configuration information. In one example, the configuration information can be utilized to configure one or more of a video capture source, a resolution of a video capture source, a source input protocol, and other source settings (e.g., a frame rate, a control port, a control protocol, etc.), among others. In another example, the configuration information can be utilized to toggle whether or not a camera is to capture images, to select an output video protocol, and to configure one or more options, among others. As shown, VDD 2249 can provide a camera command to VCS 1200 via interface 2220 and network 1010. For example, VDD 2249 can provide the camera command camera controller 1260, as illustrated.

It is noted that, in one or more embodiments, one or more of the method elements described herein and/or one or more portions of an implementation of a method element can be performed in varying orders, can be repeated, can be performed concurrently with one or more of the other method elements and/or one or more portions of an implementation of a method element, or can be omitted. Additional and/or duplicated method elements can be performed as desired. For example, a process and/or method can perform one or more described method elements concurrently with duplicates of the one or more described method elements. For instance, multiple methods, processes, and/or threads can be implemented using same described method elements.

In one or more embodiments, concurrently can mean simultaneously. In one or more embodiments, concurrently can mean apparently simultaneously according to some metric. For example, two or more method elements and/or two or more portions of an implementation of a method element can be performed such that they appear to be simultaneous to a human. In one instance, method element 8005 can be repeated and/or performed concurrently with one or more method elements 8010-8060. In a second instance, method element 9005 can be repeated and/or performed concurrently with one or more method elements 9010-9040. In another instance, method element 10010 can be repeated and/or performed concurrently with one or more method elements 10020-10040. It is also noted that, in one or more embodiments, one or more of the system elements described herein may be omitted and additional system elements can be added as desired.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system at a first location, comprising:
   a display that displays video of a first application that lacks a functionality to control a remote camera of a remote video conference system at a second location, different from the first location;
   a memory that includes the first application and a second application;
   a processor coupled to the display and the memory; and
   a network interface, coupled to the processor and configured to be coupled to a network, that receives video data from the remote video conference system, provides the video data to the first application via the processor, and provides a first camera command to the remote video conference system via the network;
   wherein the processor is configured with the first application such that the processor displays the video based on the video data via the display, wherein the video includes images of a first video conference participant at the second location; and
   wherein the processor is further configured with the second application such that the processor receives first user input that selects a first region of a plurality of regions associated with the video of the first application and that indicates a first camera action for the remote camera at the second location, determines the first camera command based on the first user input and the first region, and provides the first camera command to the remote video conference system via the network interface.

2. The system of claim 1, wherein the network includes at least one of an Internet, a local area network, a wide area network, a mobile telephone network, a wireless network, and a public switched telephone network.

3. The system of claim 1, wherein when the processor provides the first camera command to the remote video conference system via the network interface, the processor further provides the first camera command to the remote video conference system via a data path independent of another data path utilized by the first application.

4. The system of claim 1, wherein the second application further configures the processor such that the processor determines a first cursor position within the video of the first application and determines that the first cursor position is within the first region.

5. The system of claim 4, wherein the second application further configures the processor such that the processor determines a second cursor position within the video of the first application; determines that the second cursor position is within a second region of the plurality of regions of the video of the first application; receives second user input indicating a second remote camera action; determines, based on the second user input and the second region, a second remote camera command; and provides the second camera command to the remote video conference system via the network.

6. The system of claim 1, wherein the second application is a plug-in to the first application.

7. The system of claim 1, further comprising a mobile telephone that includes the display, the memory, the processor, and the network interface.

8. A computer readable memory device comprising a first set of instructions, which when executed by a processor of a first video conference system at a first location, cause the first video conference system to perform:
- interfacing with a device driver that provides a video stream of a first video camera of the first video conference system to a video conference application, wherein each of the device driver and the video conference application is executable by the processor;
- receiving, from the device driver, the video stream of the first video camera;
- providing the video stream to the video conference application;
- receiving data that indicates first user input that selects a first region of a plurality of regions of video of the video conference application and that indicates a first camera action for a remote camera of a second video conference system at a second location, different from the first location;
- determining the first camera command based on the data that indicates the first user input and the first region; and
- providing the first camera command to the second video conference system via a network interface of the first video conference system;
- wherein the device driver provides a first application interface;
- wherein said interfacing with the device driver includes interfacing with the device driver via the first application interface; and
- wherein the first set of instructions, which when executed by the processor of the first video conference system, cause the first video conference system to further perform:
  - providing a second application interface, that is at least one of compatible and compliant with the first application interface, for the video conference application to utilize; and
  - providing a third application interface for said receiving the data that indicates the first user input that selects the first region of the plurality of regions of the video of the video conference application and that indicates the first camera action for the remote camera of the second video conference system at the second location.

9. The computer readable memory device of claim 8, further comprising a second set of instructions, which when executed by the processor of the first video conference system, cause the first video conference system to perform:
- receiving the first user input that selects the first region of the plurality of regions of the video of the video conference application and that indicates the first camera action for the remote camera of the second video conference system; and
- providing, to the first set of instructions via the third application interface, the data that indicates the first user input that selects the first region of the plurality of regions of the video of the video conference application and that indicates the first camera action for the remote camera of the second video conference system.

10. The computer readable memory device of claim 8, further comprising a second set of instructions, which when executed by the processor of the first video conference system, cause the first video conference system to perform:
- receiving the first user input that selects the first region of the plurality of regions of the video of the video conference application and that indicates the first camera action for the remote camera of the second video conference system; and
- providing, to the first set of instructions, the data that indicates the first user input that selects the first region of the plurality of regions of the video of the video conference application and that indicates the first camera action for the remote camera of the second video conference system.

11. The computer readable memory device of claim 8,
- wherein the video conference application lacks a first functionality to receive the video stream via a first protocol and includes a second functionality to receive the video stream via a second protocol, different from the first protocol;
- wherein said receiving, from the device driver, the video stream of the first video camera includes receiving, from the device driver, the video stream of the first video camera via the first protocol;
- wherein the first set of instructions, which when executed by the processor of the first video conference system, cause the first video conference system to further perform:
  - transforming the video stream from the first protocol to the second protocol; and
- wherein said providing the video stream to the video conference application includes providing the video stream to the video conference application via the second protocol.

12. The computer readable memory device of claim 8, wherein the first set of instructions, which when executed by the processor of the first video conference system, cause the first video conference system to further perform:
- receiving data indicating second user input that indicates configuration information.

13. The computer readable memory device of claim 8, wherein the computer readable memory device includes a loadable kernel module that includes the first set of instructions.

* * * * *